(12) United States Patent
Fujita

(10) Patent No.: US 11,002,601 B2
(45) Date of Patent: May 11, 2021

(54) SPECTROSCOPIC MICROSCOPE AND SPECTROSCOPIC OBSERVATION METHOD

(71) Applicant: NANOPHOTON CORPORATION, Osaka (JP)

(72) Inventor: Katsumasa Fujita, Suita (JP)

(73) Assignee: NANOPHOTON CORPORATION, Osaka (JP)

( * ) Notice: Subject to any disclaimer, the term of this patent is extended or adjusted under 35 U.S.C. 154(b) by 0 days.

(21) Appl. No.: 16/484,449

(22) PCT Filed: Feb. 1, 2018

(86) PCT No.: PCT/JP2018/003456
§ 371 (c)(1),
(2) Date: Aug. 7, 2019

(87) PCT Pub. No.: WO2018/147165
PCT Pub. Date: Aug. 16, 2018

(65) Prior Publication Data
US 2020/0003618 A1    Jan. 2, 2020

(30) Foreign Application Priority Data

Feb. 7, 2017  (JP) .............................. JP2017-020786

(51) Int. Cl.
*G01J 3/04* (2006.01)
*G01J 3/28* (2006.01)
(Continued)

(52) U.S. Cl.
CPC .............. *G01J 3/04* (2013.01); *G01J 3/2803* (2013.01); *G01J 3/36* (2013.01); *G01J 3/44* (2013.01);
(Continued)

(58) Field of Classification Search
CPC ....................................................... G01J 3/04
(Continued)

(56) References Cited

U.S. PATENT DOCUMENTS

| 4,596,430 A * | 6/1986 | Olson ................ H01R 13/6392 |
|---|---|---|
| | | 439/369 |
| 4,737,642 A * | 4/1988 | Steil .................. H01L 27/14881 |
| | | 250/332 |

(Continued)

FOREIGN PATENT DOCUMENTS

| EP | 0916981 A1 | 5/1999 |
|---|---|---|
| EP | 2685303 A1 | 1/2014 |

(Continued)

OTHER PUBLICATIONS

Okuno, M. et al., "Multifocus confocal Raman microspectroscopy for fast multimode vibrational imaging of living cells," Optics Letters, vol. 35, No. 24, Available Online Oct. 21, 2010, Dec. 15, 2010, 3 pages.

(Continued)

*Primary Examiner* — Tarifur R Chowdhury
*Assistant Examiner* — Omar H Nixon
(74) *Attorney, Agent, or Firm* — McCoy Russell LLP

(57) ABSTRACT

A spectroscopic microscope according to the present embodiment includes a light source that generates laser light that enters a sample, a multi-slit part having a plurality of slits through which signal light branched by the edge filter passes, the slits being arranged in the slit width direction, and a spectrometer that disperses the signal light having passed through the slits in the dispersion direction intersecting the slit length direction and detects the signal light with a two-dimensional array photodetector.

12 Claims, 21 Drawing Sheets

(51) Int. Cl.
  *G01J 3/36* (2006.01)
  *G01J 3/44* (2006.01)
  *G01N 21/27* (2006.01)
  *G01N 21/65* (2006.01)
  *G02B 21/06* (2006.01)
(52) U.S. Cl.
  CPC ............. *G01N 21/27* (2013.01); *G01N 21/65* (2013.01); *G02B 21/06* (2013.01)
(58) Field of Classification Search
  USPC ........................................................ 356/326
  See application file for complete search history.

(56) References Cited

U.S. PATENT DOCUMENTS

| | | | | |
|---|---|---|---|---|
| 5,530,236 | A * | 6/1996 | Sensui | G02B 7/346 |
| | | | | 250/201.8 |
| 5,587,832 | A | 12/1996 | Krause | |
| 6,031,661 | A | 2/2000 | Tanaami | |
| 6,141,104 | A * | 10/2000 | Schulz | G01D 5/34 |
| | | | | 356/616 |
| 7,636,158 | B1 * | 12/2009 | Pawluczyk | G01J 3/02 |
| | | | | 356/326 |
| 2002/0008148 | A1 | 1/2002 | Empedocles et al. | |
| 2002/0056816 | A1 * | 5/2002 | Stark | G02B 21/0076 |
| | | | | 250/493.1 |
| 2003/0059855 | A1 * | 3/2003 | Cunningham | G01J 3/42 |
| | | | | 435/7.9 |
| 2005/0128476 | A1 * | 6/2005 | Zhao | G01J 3/44 |
| | | | | 356/301 |
| 2006/0114458 | A1 * | 6/2006 | Osawa | G01J 3/18 |
| | | | | 356/328 |
| 2006/0140611 | A1 * | 6/2006 | Kuwakino | G02B 13/146 |
| | | | | 396/91 |
| 2006/0169873 | A1 | 8/2006 | Seyfried et al. | |
| 2008/0030729 | A1 * | 2/2008 | DiFoggio | G01N 21/31 |
| | | | | 356/328 |
| 2008/0049220 | A1 * | 2/2008 | Izzia | G01J 3/04 |
| | | | | 356/300 |
| 2008/0049293 | A1 * | 2/2008 | Deck | G01J 3/0229 |
| | | | | 359/227 |
| 2009/0002695 | A1 * | 1/2009 | Saito | G01N 21/9501 |
| | | | | 356/237.4 |
| 2009/0014658 | A1 * | 1/2009 | Cottier | H01L 27/14601 |
| | | | | 250/370.08 |
| 2010/0039643 | A1 * | 2/2010 | Park | G01J 3/18 |
| | | | | 356/328 |
| 2010/0039644 | A1 * | 2/2010 | Choi | G01N 21/6454 |
| | | | | 356/328 |
| 2011/0037077 | A1 | 2/2011 | Ichimura et al. | |
| 2014/0002819 | A1 | 1/2014 | Kawata et al. | |
| 2014/0340677 | A1 | 11/2014 | Sataka et al. | |
| 2015/0177506 | A1 | 6/2015 | Nishiwaki | |
| 2017/0276610 | A1 | 9/2017 | Fujita et al. | |

FOREIGN PATENT DOCUMENTS

| | | |
|---|---|---|
| JP | 2004500669 A | 1/2004 |
| JP | 2005202009 A | 7/2005 |
| JP | 2007163448 A | 6/2007 |
| JP | 2007163448 A | 2/2011 |
| JP | 2011038922 A | 2/2011 |
| JP | 2012150331 A | 8/2012 |
| JP | 2012189891 A | 10/2012 |
| JP | 2015135463 A | 7/2015 |
| WO | 2013118666 A1 | 8/2013 |
| WO | 2016027453 A1 | 2/2016 |

OTHER PUBLICATIONS

Watanabe, K. et al., "Structured line illumination Raman microscopy," Nature Communications, vol. 6, No. 10095, Dec. 2, 2015, 8 pages.

ISA Japan Patent Office, International Search Report Issued in Application No. PCT/JP2018/003456, dated Apr. 24, 2018, WIPO, 4 pages.

European Patent Office, Extended European Search Report Issued in Application No. 18750965.8, dated Dec. 2, 2020, 8 pages.

* cited by examiner

SPECTROSCOPIC MICROSCOPE AND SPECTROSCOPIC OBSERVATION METHOD

CROSS-REFERENCE TO RELATED APPLICATIONS

The present application is a U.S. National Phase of International Patent Application Serial No. PCT/JP2018/003456 entitled "SPECTROSCOPIC MICROSCOPE, AND SPECTROSCOPIC OBSERVATION METHOD," filed on Feb. 1, 2018. International Patent Application Serial No. PCT/JP2018/003456 claims priority to Japanese Patent Application No. 2017-020786 filed on Feb. 7, 2017. The entire contents of each of the above-referenced applications are hereby incorporated by reference for all purposes.

TECHNICAL FIELD

The present invention relates to a spectroscopic microscope and a spectroscopic observation method.

BACKGROUND AND SUMMARY

As an observation method of the fine structure of an object to be observed, Raman spectroscopic microscopes are known. Raman spectroscopic microscopes are widely used in many fields, such as materials engineering, medical diagnosis, and drug discovery, since they can acquire spatial distribution while measuring the frequency of a molecule or crystal lattice vibration.

Non Patent Literature 1 discloses a Raman microscope including a spectrometer for measuring a Raman spectrum. In the Raman microscope disclosed in Non Patent Literature 1, a micro lens array that generates a beam array is arranged in the optical path of laser light. A sample is illuminated with an 8×8 beam array generated by the micro lens array. Then, the Raman scattering light enters an 8×8 fiber bundle.

The fiber bundle is arranged to be 1×64 at an entrance slit of the spectrometer. That is, 64 fibers are arranged in a line at the emission end of the fiber bundle. Then, the Raman scattering light emitted from the fiber bundle is spatially dispersed by wavelength by the spectrometer and detected by a CCD camera. Thus, two-dimensional spatial information and one-dimensional spectrum information are converted into two-dimensional array information on the light-receiving surface of the CCD camera and detected. The spectrum of the Raman scattering light generated at multiple points of the sample can be simultaneously measured.

CITATION LIST

Non Patent Literature

Non Patent Literature 1: Masanari Okuno and Hiro-o Hamaguchi, "Multifocus confocal Raman microspectroscopy for fast multimode vibrational imaging of living cells" OPTICS LETTERS/Vol. 35, No. 24/Dec. 15, 2010

Technical Problem

With such a Raman microscope, information detected at a time is limited to the number of pixels of a CCD camera. Then, in the Raman microscope disclosed in Non Patent Literature 1, the Raman scattering light from the region illuminated by a beam array is converted into one line by the fiber bundle. For this reason, the region that can acquire two-dimensional spatial information is limited to the number of pixels of the line. In addition, since the information needs to be spatially separated from each point of the beam array by the CCD camera, a half of the number of pixels of the CCD camera at most is only used. For example, since the 64 fibers are converted into one line in Patent Literature 1, the Raman scattering light from 64 points of the sample is only detected simultaneously.

In addition, the Raman scattering light from a point of the sample is dispersed to the entire CCD camera. Thus, when the band of the spectrum to be measured is narrow, a part of pixels detects light having a wavelength unnecessary for the measurement. For this reason, spectroscopic microscopes are desired to more efficiently measure a spectrum.

The present invention has been made in view of the above, and a purpose of the present invention is to provide a spectroscopic microscope and a spectroscopic observation method that are capable of efficiently measuring a spectrum.

Solution to Problem

A spectroscopic microscope according to a first aspect of the present invention includes a light source that generates excitation light, an illumination optical system that guides the excitation light to a sample to illuminate an illumination region of the sample illuminated with the excitation light, a multi-slit part including a plurality of slits through which signal light from the illumination region of the sample illuminated with the excitation light passes, the slits being arranged in a slit width direction, and a spectrometer that disperses the signal light having passed through the slits in a dispersion direction intersecting a slit length direction and detects the signal light with a two-dimensional array photodetector. Accordingly, it is possible to efficiently measure a spectrum.

In the above spectroscopic microscope, a wavelength selection part that selects a wavelength range of the signal light may be provided in an optical path from the sample to the spectrometer. Accordingly, it is possible to efficiently measure a spectrum.

In the above spectroscopic microscope, it is preferable that a wavelength range to be selected by the wavelength selection part is variable. Accordingly, it is possible to change a wavelength range to be measured, and to efficiently measure a spectrum.

In the above spectroscopic microscope, a plurality of linear illumination regions on the sample may be illuminated with the excitation light.

In the above spectroscopic microscope, at least one of a slit width, a position, and the number of the slits may be variable. Accordingly, it is possible to change wavelength resolution.

In the above spectroscopic microscope, the multi-slit part may be formed by a slit plate including at least a first slit group including a plurality of slits having a first slit width and a second slit group including a plurality of slits having a second slit width, and a condition in which the signal light passes through the slits of the first slit group and enters the spectrometer and a condition in which the signal light passes through the slits of the second slit group and enters the spectrometer may be switched by moving the slit plate. Accordingly, it is possible to change wavelength resolution with a simple configuration.

In the above spectroscopic microscope, the multi-slit part may include a liquid crystal panel. Accordingly, it is possible to change wavelength resolution with a simple configuration.

In the above spectroscopic microscope, an illumination optical system from the light source to the sample may include a spatial modulator that modulates excitation light according to a control signal to illuminate the linear illumination regions on the sample. Accordingly, it is possible to properly perform multi-line illumination.

In the above spectroscopic microscope, the spectrometer may include at least a first spectrometer that detects the signal light in a first wavelength band and a second spectrometer that detects the signal light in a second wavelength band different from the first wavelength band, and the multi-slit part may be arranged on an incident side of each of the first spectrometer and the second spectrometer.

In the above spectroscopic microscope, the two-dimensional array photodetector may include at least a first region that detects the signal light in a first wavelength band and a second region that detects the signal light in a second wavelength band different form the first wavelength band, and the first region may be shifted from the second region in a longitudinal direction of the slits.

The above spectroscopic microscope may further include a cylindrical lens array that is arranged on an incident side of the multi-slit part and condenses the signal light on the slits.

In the above spectroscopic microscope, the illumination optical system from the light source to the sample may include an objective lens that condenses the light from the light source on the sample, a reflection member that reflects the signal light generated at the sample may be arranged on a side of the sample opposite to the objective lens, and the signal light reflected by the reflection member may enter the objective lens. Accordingly, it is possible to increase the intensity of the signal light to be detected by the spectrometer.

The above spectroscopic microscope may further include a cylindrical lens array that is arranged on an incident side of the multi-slit part and condenses the signal light on the slits.

A spectroscopic observation method according to the first aspect of the present invention includes the steps of generating excitation light, guiding the excitation light to a sample, causing signal light from an illumination region of the sample illuminated with the excitation light to enter a multi-slit part having a plurality of slits arranged in a slit width direction, and dispersing the signal light having passed through the slits of the multi-slit part in a dispersion direction intersecting a slit length direction and detecting the signal light with a two-dimensional array photodetector.

Advantageous Effects of Invention

According to the present invention, it is possible to provide a spectroscopic microscope and a spectroscopic observation method that are capable of efficiently measuring a spectrum.

DESCRIPTION OF EMBODIMENTS

Figure 1:
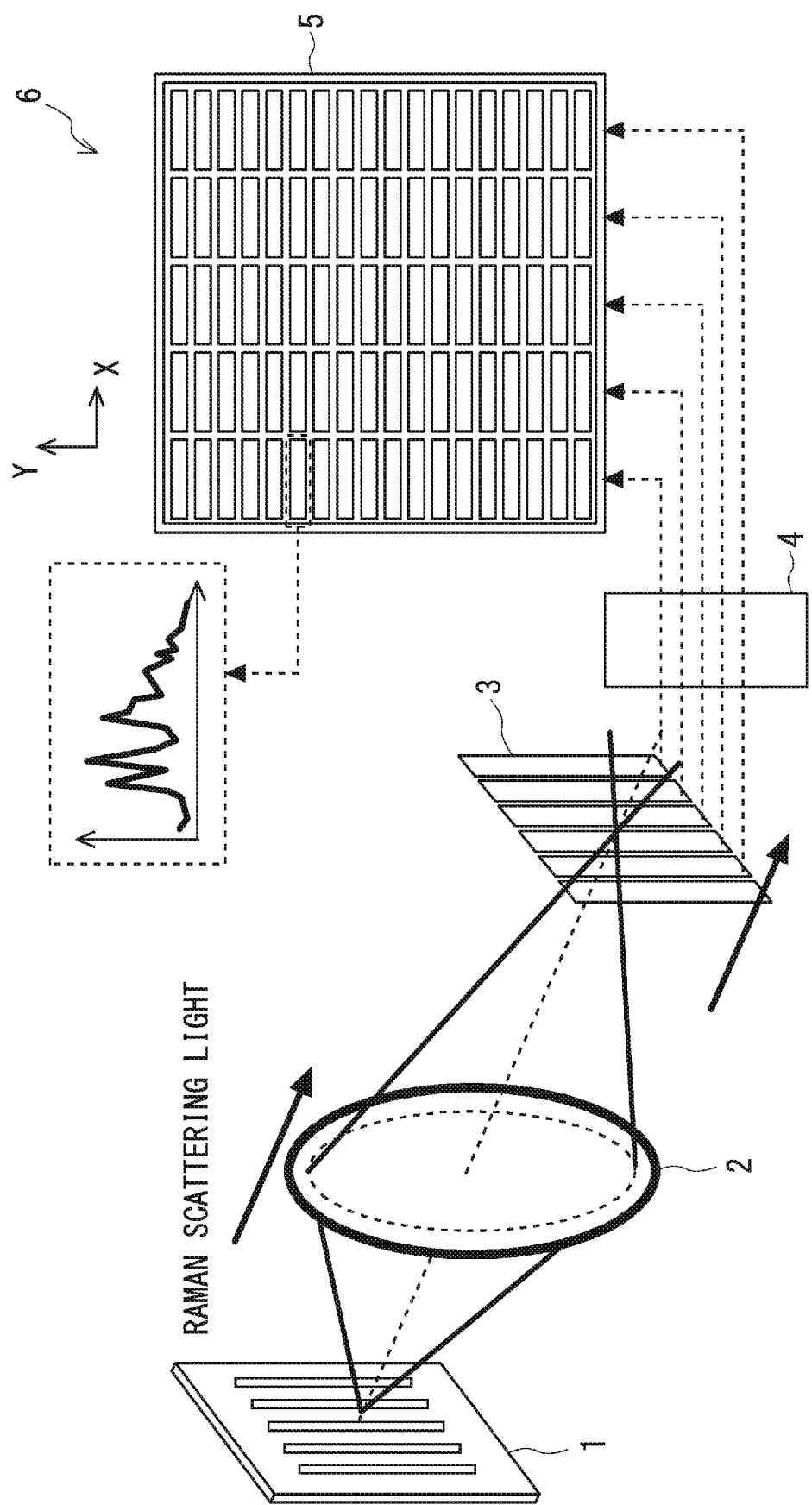
FIG. 1 is a diagram for explaining the concept of a spectroscopic microscope according to the present embodiment.

Hereinafter, embodiments of the present invention are described with reference to the drawings. In the drawings, the same elements are denoted by the same reference signs, and duplicated descriptions are omitted as necessary.

The concept of a spectroscopic microscope according to the present embodiment is described with reference to FIG. 1. In the spectroscopic microscope according to the present embodiment, a sample 1 is illuminated with excitation light from a light source (not shown in FIG. 1). Specifically, a plurality of linear (band-like) illumination regions of the sample 1 is simultaneously illuminated with excitation light. At an illumination region, Raman scattering is induced. Then, Raman scattering light (hereinafter, also referred to as signal light) generated at the illumination regions of the sample 1 enters a multi-slit part 3 through a detection optical system 2. In FIG. 1, the detection optical system 2 including an objective lens is simplified.

The multi-slit part 3 is an entrance slit arranged on the incident side of a spectrometer 6. The multi-slit part 3 has a plurality of slits arranged in the slit width direction. The signal light from the illumination regions enters each slit of the multi-slit part 3 through the detection optical system 2. The detection optical system 2 forms an image of the sample 1 on the multi-slit part 3. The multi-slit part 3 allows the signal light from the linear illumination regions of the sample 1 to pass through the spectrometer 6.

The spectrometer 6 disperses and detects the signal light to measure the Raman spectrum. Specifically, the spectrometer 6 includes a wavelength dispersing element 4 and a photodetector 5. The photodetector 5 includes a plurality of pixels arranged in a dispersion direction (X direction) and a slit length direction (Y direction). The photodetector 5 is a two-dimensional array photodetector. The signal light is dispersed by wavelength by the wavelength dispersing element 4, and spectrum information is thereby arranged in the X direction of the photodetector 5.

The signal light from adjacent slits of the multi-slit part 3 is dispersed so as not to overlap with each other on the photodetector 5. Thus, it is possible to simultaneously measure the Raman spectrum from the linear illumination regions. It is possible to simultaneously measure the Raman scattering light from the points on the sample as many as possible. Thus, it is possible to effectively use the limited pixels of the photodetector 5, and to efficiently measure the Raman spectrum. Accordingly, it is possible to shorten the time for measuring the Raman spectrum.

First Embodiment

Figure 2:
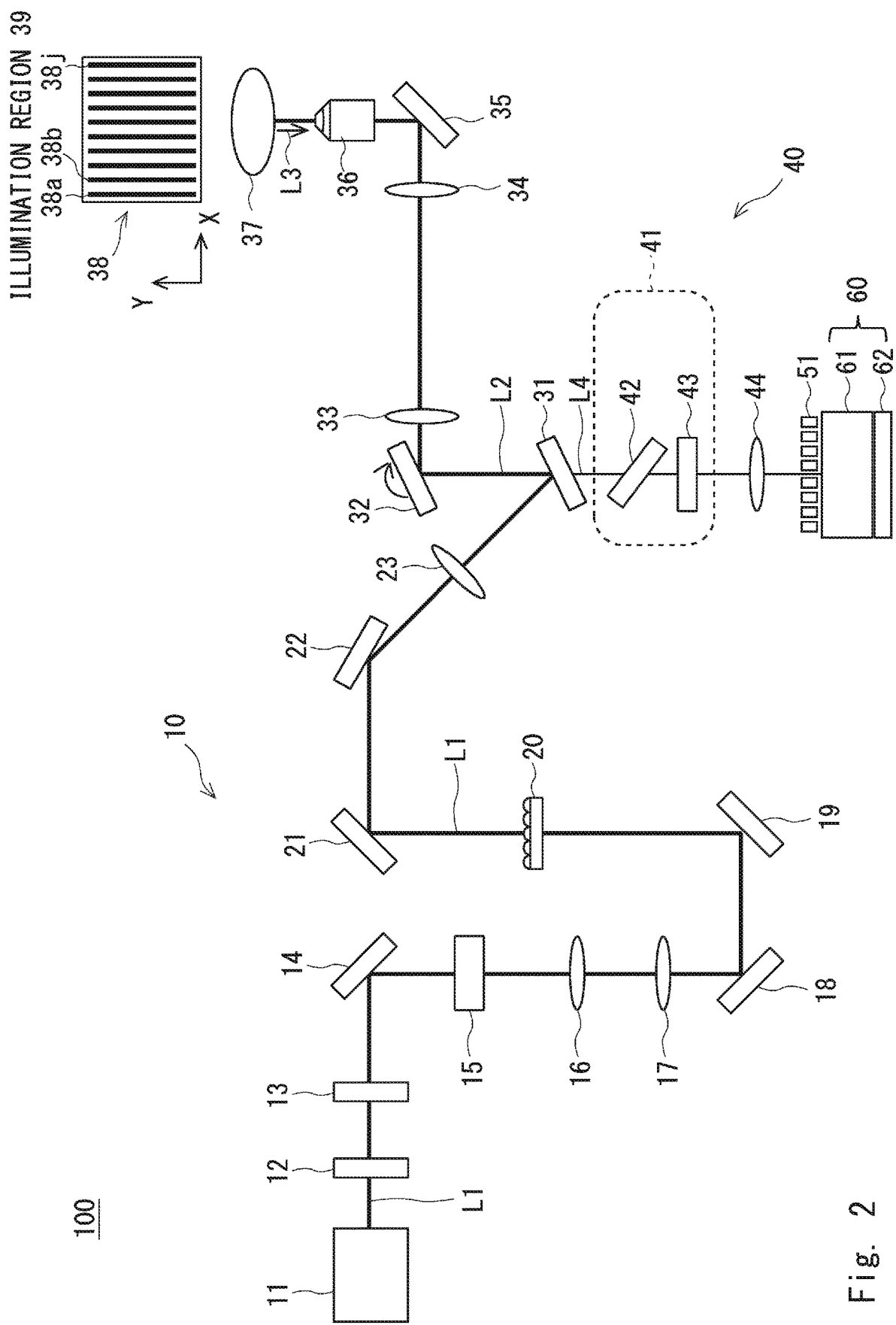
FIG. 2 is a diagram showing a configuration of an optical system of a spectroscopic microscope according to a first embodiment.

A spectroscopic microscope according to a first embodiment is described with reference to FIG. 2. FIG. 2 is a diagram showing a configuration of an optical system of a spectroscopic microscope 100. The spectroscopic microscope 100 includes a light source 11, an illumination optical system 10, a detection optical system 40, a spectrometer 60, and a multi-slit part 51. Here, a direction parallel to the optical axis regardless of reflection by a mirror or the like is referred to as a Z direction, and a plane perpendicular to the optical axis is referred to as an XY plane. An X direction and a Y direction are orthogonal to each other.

First, the illumination optical system 10 is described. The illumination optical system 10 is an optical system that guides excitation light from the light source 11 to a sample 37 to illuminate a plurality of linear illumination regions on the sample 37 with the light. The illumination optical system 10 includes a Glan-laser prism 12, a half wave plate 13, a mirror 14, a laser line filter 15, a lens 16, a lens 17, a mirror 18, a mirror 19, a cylindrical lens array 20, a mirror 21, a mirror 22, a lens 23, an edge filter 31, a galvanometer mirror 32, a lens 33, a lens 34, a mirror 35, and an objective lens 36.

The light source 11 emits laser light L1 that becomes excitation light. The light source 11 is a monochromatic light source that emits, for examples, red or green monochromatic light. For example, the light source 11 is an Nd/YVO4 laser that emits Continuous Wave (CW) light having the wavelength of 532 nm as laser light L1. As the light source 11, Millennia manufactured by Spectra-Physics can be used, for example.

The laser light L1 from the light source 11 becomes linearly polarized light with a high degree of polarization by the Glan-laser prism 12 and enters the half wave plate 13. The half wave plate 13 rotates the vibration direction of the linearly polarized light. The laser light L1 having passed through the half wave plate 13 is reflected by the mirror 14 and enters the laser line filter 15. The laser line filter 15 is a narrow bandpass filter having the laser wavelength (532 nm) as the center wavelength.

The laser light L1 having passed through the laser line filter 15 is refracted by the lens 16 and the lens 17. The lens 16 and the lens 17 serve as beam expanders that expand the beam diameter of the laser light L1. For example, the focal lengths of the lens 16 and the lens 17 are 75 mm and 150 mm respectively. The laser light L1 refracted by the lens 16 and the lens 17 becomes collimated light beam and enters the mirror 18. The laser light L1 reflected by the mirror 18 enters the mirror 19. The laser light L1 reflected by the mirror 19 enters the cylindrical lens array 20.

In the cylindrical lens array 20, a plurality of cylindrical lenses are arranged. Thus, the laser light L1 having passed through the cylindrical lens array 20 is converted into a plurality of illumination light rays. Each cylindrical lens of the cylindrical lens array 20 condenses the laser light L1 in the X direction. The longitudinal direction of a line is referred to as a Y direction, and the direction in which a plurality of lines is referred to as an X direction. For example, the array pitch of the cylindrical lens array 20 is 0.3 mm, the focal length of each cylindrical lens is 7.92 mm, and the radius of curvature is 3.6 mm.

The laser light L1 having passed through the cylindrical lens array 20 is reflected by the mirrors 21 and 22 and enters the lens 23. The focal length of the lens 23 is 200 mm. The laser light refracted by the lens 23 is reflected by the edge filter 31. The edge filter 31 has a cutoff wavelength longer than the laser wavelength. Thus, the edge filter 31 reflects the light having the laser wavelength and transmits the Raman scattering light having the wavelength longer than the laser wavelength. The laser light reflected by the edge filter 31 is referred to as laser light L2.

The laser light L2 reflected by the edge filter 31 enters the galvanometer mirror 32. For example, scanning is performed in the X direction of the linear laser light L2. By scanning with the galvanometer mirror 32, a predetermined region of the sample 37 is observed. The laser light L2 reflected by the galvanometer mirror 32 is refracted by the lens 33 and the lens 34. The focal distances of the lens 33 and the lens 34 are 160 mm and 200 mm respectively. The laser light L2 having passed through the lens 34 is reflected by the mirror 35 and enters the objective lens 36. As the objective lens 36, a 60×/1.27 WI objective lens manufactured by Nikon corporation can be used, for example.

Figure 3:
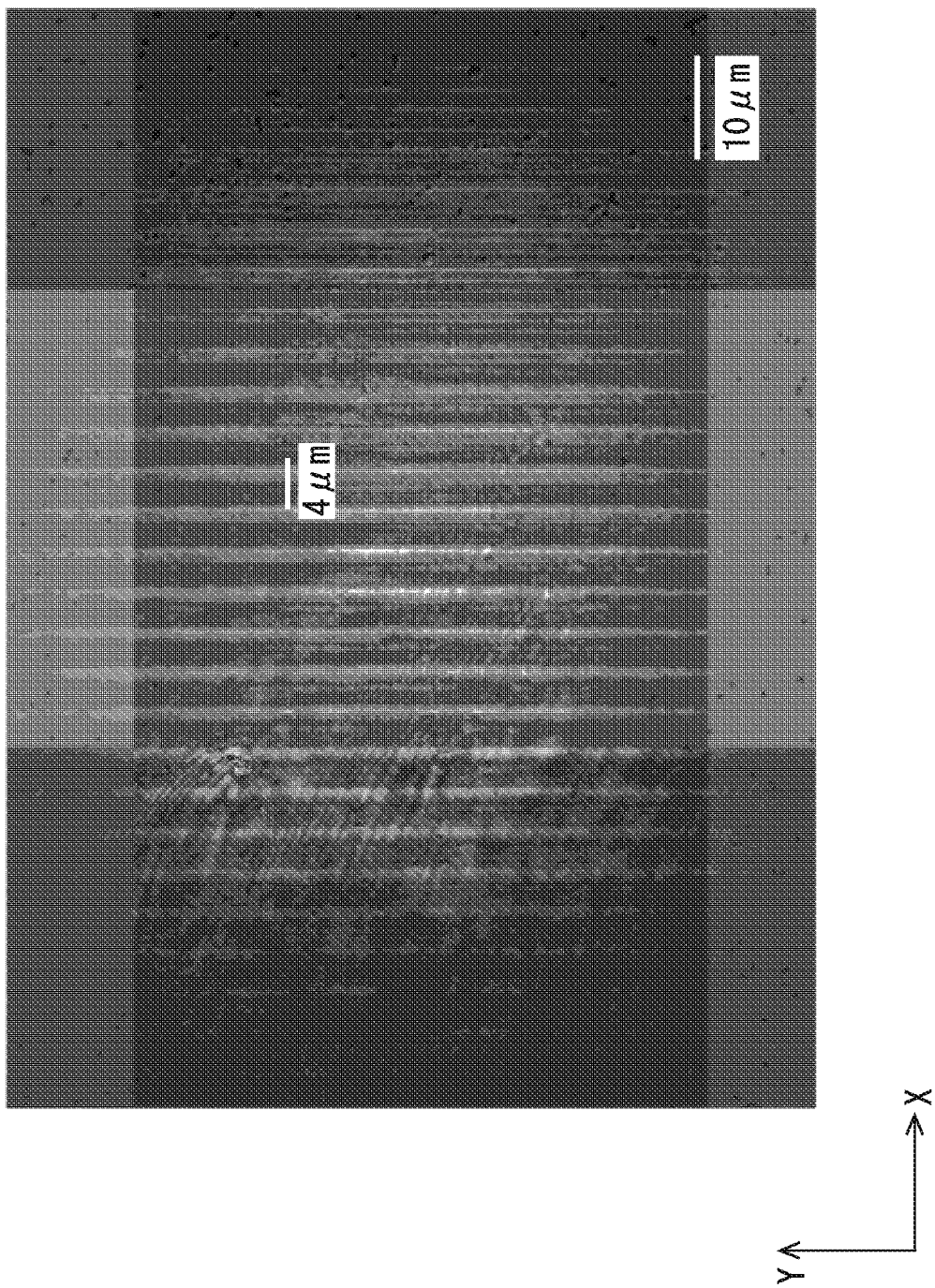
FIG. 3 is an image obtained by photographing an illumination region on a sample.

The laser light L2 is condensed on the sample 37 by the objective lens 36. The cylindrical lens array 20 condenses the laser light L2 so that the laser light L2 is to be multiple lines. Thus, the laser light L2 forms a plurality of linear illumination regions 39 on the sample 37. That is, the sample 37 is illuminated with multi-line illumination. The illumination regions 39 formed by the laser light L2 on the sample 37 are linear regions. That is, the cylindrical lens array 20 causes the multi-line illumination. The longitudinal direction of each line is the Y direction. Then, a plurality of lines 38 is arranged in the X direction. FIG. 2 shows the first line of ten lines 38 as a line 38a, the second line as a line 38b, and the tenth line as a line 38j. FIG. 3 shows an example of an image of the pattern of the illumination regions 39 formed on the sample 37.

At a position of the sample 37 where the laser light L2 has entered, Raman scattering is induced. Thus, the Raman scattering light is generated from the linear illumination regions 39. A part of the Raman scattering light enters the objective lens 36. Note that, the Raman scattering light having entered the objective lens 36 is referred to as signal light L3. In addition, Rayleigh scattering light having the same wavelength as the laser light L2 enters an objective lens 36. The signal light L3 having passed through the objective lens 36 propagates through the optical path through which the laser light L2 has propagated in the opposite direction. Note that, the sample 37 may be arranged on a driving stage movable in the XY directions. By moving the driving stage, it is possible to illuminate a desired region of the sample 37.

Next, the detection optical system 40 that guides the signal light L3 generated at the sample 37 to the spectrometer 60 is described. The detection optical system 40 includes the objective lens 36, the mirror 35, the lens 34, the lens 33, the galvanometer mirror 32, the edge filter 31, a wavelength selection part 41, a lens 44, and the multi-slit part 51.

The signal light L3 is reflected by the mirror 35 and enters the lens 34. Then, the signal light L3 is refracted by the lens 34 and the lens 33 and enters the galvanometer mirror 32. The galvanometer mirror 32 de-scans and reflects the signal light L3 toward the edge filter 31.

The edge filter 31 is a light branching means for branching the signal light L3 from Rayleigh scattering light according to the wavelength. The edge filter 31 has a cutoff wavelength longer than the wavelength of the laser light L2. Thus, the signal light L3 having a wavelength longer than the cutoff wavelength penetrates the edge filter 31. The signal light L3 having the wavelength longer than the cutoff wavelength is reflected by the edge filter 31. Thus, the optical path of the signal light L3 is branched from the optical path of the laser light L2. The signal light L3 having passed through the edge filter 31 is referred to as signal light L4.

The signal light L4 having passed through the edge filter 31 enters the wavelength selection part 41. The wavelength selection part 41 selects the wavelength range (wavenumber range) of the signal light L4 to be detected by a photodetector 62. For this reason, the wavelength selection part 41 includes a low-pass filter 42 and a bandpass filter 43. The low-pass filter (long-pass filter) 42 is a long-pass filter that transmits a component in a low-frequency band (long-wavelength range) and blocks a component in a high-frequency band (low-wavelength range). The bandpass filter (BPF) 43 transmits a component only in a predetermined wavelength range. The wavelength selection part 41 selects the band of the pass wavelength of the signal light L4. Note that, by adjusting the inclination of the low-pass filter 42 to the optical axis, it is possible to adjust a passing wavelength range.

The wavelength selection part 41 includes one or more optical filters. Then, the wavelength selection part 41 limits the wavelength range of the signal light L4. In addition, by replacing one or more optical filters to be arranged at the wavelength selection part 41 or adjusting the inclination of the optical filters, it is possible to vary the wavelength range to be selected. The optical filters to be used for the wavelength selection part 41 are not limited to the low-pass filter 42 and the bandpass filter 43, and may be a multi bandpass filter, a high-pass filter (short-pass filter), and the like. Naturally, two or more optical filters may be combined. Furthermore, a transmission wavelength variable filter using liquid crystal or the like, or a spectrometer of low-wavelength resolution using a prism and a spatial mask may be used as the wavelength selection part 41.

The signal light L4 having passed through the low-pass filter 42 and the bandpass filter 43 enters the lens 44. The lens 44 is an imaging lens that forms an image of the sample 37 on the multi-slit part 51. That is, the multi-slit part 51 and the sample 37 are arranged at a conjugate position. The focal length of the lens 44 is, for example, 400 mm.

Figure 4:
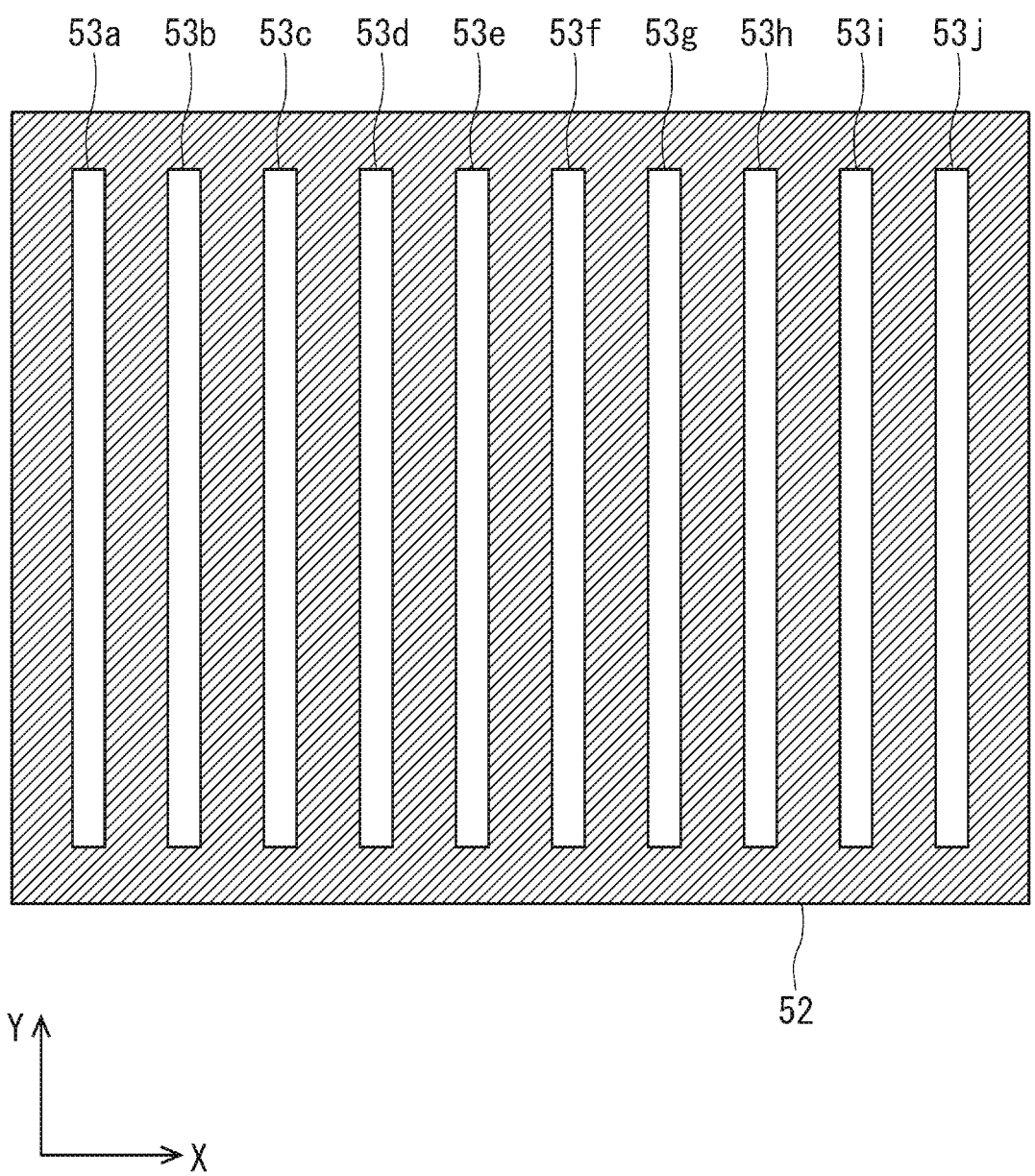
FIG. 4 is a plan view schematically showing the structure of a multi-slit part.

The structure of the multi-slit part 51 is described with reference to FIG. 4. FIG. 4 is an XY plan view showing the structure of the multi-slit part 51. The multi-slit part 51 includes a slit plate 52 and a plurality of slits 53a to 53j. The slits 53a to 53j are formed in the slit plate 52. Note that, in the following description, the slits 53a to 53j are simply referred to as the slits 53 unless identified. FIG. 4 shows, as an example, that ten slits 53a to 53j are formed in the slit plate 52, but the number of slits 53 is not limited as long as the number is two or more.

The signal light L4 having entered the slits 53 passes through the multi-slit part 51 and is detected by the spectrometer 60. The signal light L4 having entered positions other than the slits 53 of the slit plate 52 is blocked by the multi-slit part 51 and is not detected by the spectrometer 60.

Each of the slits 53a to 53j has its longitudinal direction (slit length direction) in the Y direction and its latitudinal direction (slit width direction) in the X direction. The slits 53 are arranged in the X direction. FIG. 4 shows that the ten slits 53a to 53j are arranged at equal intervals in the X direction. The slits 53a to 53j have the same slit width and the same slit length. The slits 53a to 53j are arranged at the same position in the Y direction.

The slits 53a to 53j correspond to the lines 38 of the illumination regions 39 on the sample 37. For example, the Raman scattering light generated at the first line 38a passes through the slit 53a. Similarly, the Raman scattering light generated at the second line 38b passes through the slit 53b. The Raman scattering light generated at the tenth line 38j passes through the slit 53j.

The signal light L4 having passed through the multi-slit part 51 enters the spectrometer 60. The spectrometer 60 includes a spectral part 61 and the photodetector 62. The spectral part 61 includes a wavelength dispersing element, such as a diffraction grating or a prism. The spectral part 61 may further include a concave mirror or a lens. The spectral part 61 disperses the signal light L4 in the X direction.

The photodetector 62 is a two-dimensional array photodetector, such as a two-dimensional CCD camera. The photodetector 62 is an image sensor including a plurality of pixels arranged in an array. The photodetector 62 is, for example, a Charge Coupled Device (CCD) camera or a Complementary Metal Oxide Semiconductor (CMOS) image sensor. The photodetector 62 outputs a detection signal according to the detected light amount of each pixel to a processing apparatus (not shown). The processing apparatus is a personal computer or the like and stores, in a memory or the like, the value of the detection signal in association with the XY coordinates of the pixel.

For example, the photodetector 62 is a cooling CCD camera including 2048 pixels in the X direction and 2048 pixels in the Y direction. The pixels of the photodetector 62 are arranged along the direction corresponding to the slits 53. Thus, one arrangement direction of the pixels of the photodetector 62 is coincident with the slit length direction (Y direction), and the other arrangement direction is coincident with the dispersion direction (the X direction) of the spectral part 61. The distribution of the light intensity in the X direction of the photodetector 62 indicates the distribution of the Raman spectrum. The signal light L4 having passed through different slits 53 at the multi-slit part 51 is detected by different pixels.

Figure 5:
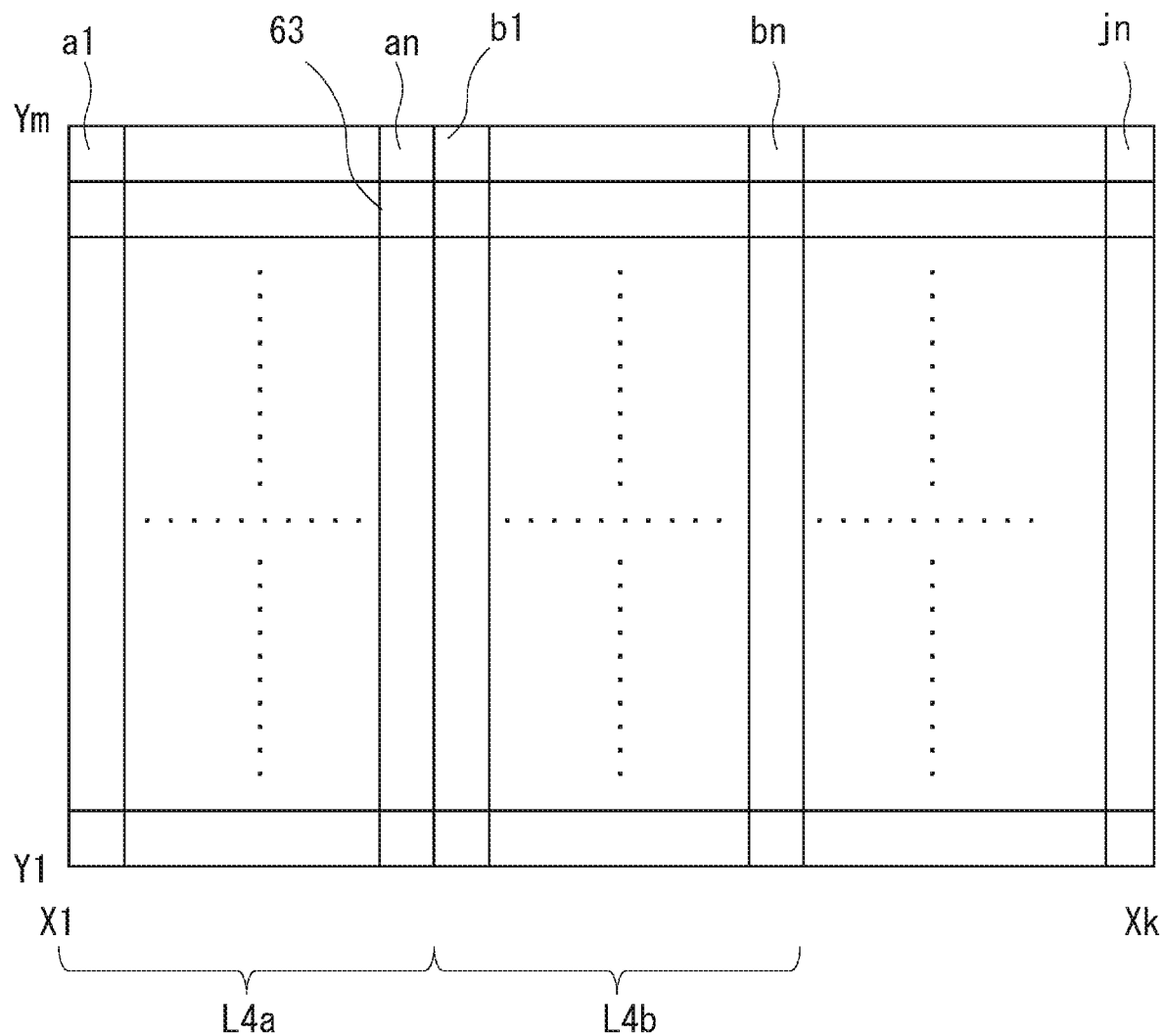
FIG. 5 is a diagram schematically showing pixels of a photodetector and signal light.
Figure 5:
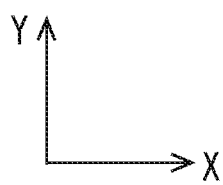

With reference to FIG. 5, the pixels of the photodetector 62 and the signal light L4 are described. FIG. 5 is a plan view schematically showing the light-receiving surface of the photodetector 62. As shown in FIG. 5, a plurality of pixels 63 is arranged in the X direction and Y direction. In FIG. 5, the signal light L4 having passed through the slit 53a is referred to as signal light L4a, and the signal light L4 having passed through the slit 53b is referred to as signal light L4b.

Note that, FIG. 5 shows the X coordinates of the pixels 63 of the photodetector 62 as X1 to Xk, and the Y coordinates as Y1 to Ym. In addition, each of k and m is an integer of two or more. The signal light L4 has passed through the slits 53 extending in the Y direction, and is detected by the pixels 63 at the Y coordinates Y1 to Ym. That is, the Raman scattering light generated at different positions on the sample 37 in the Y direction is detected at the pixels 63 at different Y coordinates.

The signal light L4a has been dispersed to n pixels 63 in the X direction. Specifically, the X coordinates of the pixels 63 which the signal light L4a enters are referred to as (a1) to (an). For example, the signal light L4a generated at a point on the sample 37 is dispersed to the pixels at (a1, Y1) to (an, Y1) according to the wavelength. One of the pixel 63 at the X coordinate (a1) and the pixel 63 at the X coordinate (an) corresponds to a shorter wavelength, and the other corresponds to a longer wavelength. Thus, in the range from (a1) to (an), the X coordinate of a pixel 63 corresponds to the wavelength of the signal light L4a. The signal light L4a is detected by (n×m) pixels 63 at (a1, Y1) to (an, Ym). Note that, n is an integer of two or more.

The signal light L4b is similarly dispersed to n pixels 63 in the X direction. The X coordinates of the pixels 63 which the signal light L4b enters are referred to as (b1) to (bn). For example, the signal light L4b generated at a point on the sample 37 is dispersed to the pixels at (b1, Y1) to (bn, Y1) according to the wavelength. One of the pixel 63 at the X coordinate (b1) and the pixel 63 at the X coordinate (bn) corresponds to a shorter wavelength, and the other corresponds to a longer wavelength. Thus, in the range from (b1) to (bn), the X coordinate of a pixel 63 corresponds to the wavelength of the signal light L4b. The signal light L4b is detected by (n×m) pixels 63 at (b1, Y1) to (bn, Ym). Thus, the Raman spectrum of the signal light L4a and the Raman spectrum of the signal light L4b in a similar wavelength range are simultaneously obtained.

The signal light L4 having passed through the other slits 53c to 53j is similarly dispersed and detected by (n×m) pixels 63. In this manner, the signal light L4 having passed through one slit 53 is detected by (n×m) pixels 63. The Y coordinate of a pixel 63 corresponds to a position of the sample 37 in the Y direction. The X coordinate of a pixel 63 corresponds to a wavelength of the signal light L4. In addition, the signal light L4 having passed through adjacent slits 53 is detected by the pixels 63 at different X coordinates. Thus, it is possible to convert two-dimensional spatial information on the sample and wavelength information about the Raman scattering light into two-dimensional information on the light-receiving surface. Thus, it is possible to measure the Raman spectrums generated at the linear illumination regions 39 of the sample 37 with a frame of the photodetector 62.

The signal light L4 having passed through different slits 53 is detected by different pixels 63 in the X direction. For example, the pixel which the signal light L4a enters is shifted from the pixel which the signal light L4b enters in the X direction. Thus, the signal light L4a and the signal light L4b which have been dispersed by wavelength do not overlap with each other on the light-receiving surface of the photodetector 62. When the photodetector 62 has 2000× 2000 pixels 63, and the number of slits 53 is five, 400×2000 pixels 63 are allocated to one slit 53. That is, the number of detection wavelengths allocated to one slit 53 is 400. Then, the Raman spectrum from 10000 (=2000 pixels×5 slits) observation points is simultaneously obtained.

The number of pixels of the photodetector 62 is limited. Thus, when the number of slits is increased, the number of observation points is increased, but the number of spectrum points (wavenumber axes) to be measured is reduced. However, a large number of spectrum points is not required depending on an object to be observed or observation purpose. That is, if a wavelength range to be measured is narrow, a large number of spectrum points is not required.

For example, although an application has a narrow wavelength range to be measured, it is possible to efficiently use all the pixels 63 of the photodetector 62 in the X direction using the multi-slit part 51. Thus, it is possible to efficiently use the Raman spectrum. It is possible to increase the number of simultaneously-measured observation points of a spectrum, and to shorten the measurement time.

Note that, the dispersion direction by the spectral part 61 is not limited to the direction parallel to the X direction, and may be an oblique direction inclined from the X direction. That is, the dispersion direction may not be completely coincident with the X direction, which is the pixel arrangement direction. The dispersion direction is only required to intersect the slit length direction in the XY plane. With this configuration, it is possible to effectively use a camera having a large number of pixels. The spectrum of each point is extracted by image processing, such as transformation from a rhombic image to a rectangular image.

By adjusting the number of lines and the line interval of an illumination region 39, the number of slits and the slit interval of the multi-slit part 51, the optical system of the spectrometer 60, and the like, it is possible to arbitrarily set a wavelength range and the number of spectrum points to be measured. For example, a plurality of slit plates 52 each having a different number of slits and a plurality of cylindrical lens arrays 20 each having a different number of cylindrical lenses are prepared, and the number of slits and the number of cylindrical lenses are changed depending on an application. Thus, it is possible to shorten the measurement time of the Raman spectrum according to an object to be observed and an observation purpose.

Note that, in order for the signal light L4 having passed through adjacent slits 53 not to overlap with each other on the light-receiving surface of the photodetector 62, the spectral part 61 branches the signal light L4. Specifically, the X coordinates (a1) to (an) and the X coordinates (b1) to (bn) do not overlap with each other at all and are separated. The value of the X coordinate (b1) is an integer greater than the value of (an). By appropriately adjusting the interval of the slits 53 and the wavelength range to be selected by the wavelength selection part 41, it is possible for the signal light L4 having passed through adjacent slits 53 not to overlap on the light-receiving surface. With regard to a part of wavelengths unnecessary for spectrum measurement, the signal light having passed through adjacent slits 53 may enter the same pixel. For example, the pixels 63 at the X coordinates (a1) to (an) and the pixels 63 at (b1) to (bn) may partially overlap with each other. Alternatively, between the pixel 63 at the X coordinate (an) and the pixel 63 at the X coordinate (b1), there may be pixels which the signal light does not enter.

In addition, the wavelength range to be measured is selected by the wavelength selection part 41. By changing an optical filter of the wavelength selection part 41, it is possible to vary the wavelength range to be measured. This point is described with reference to FIG. 6.

Figure 6:
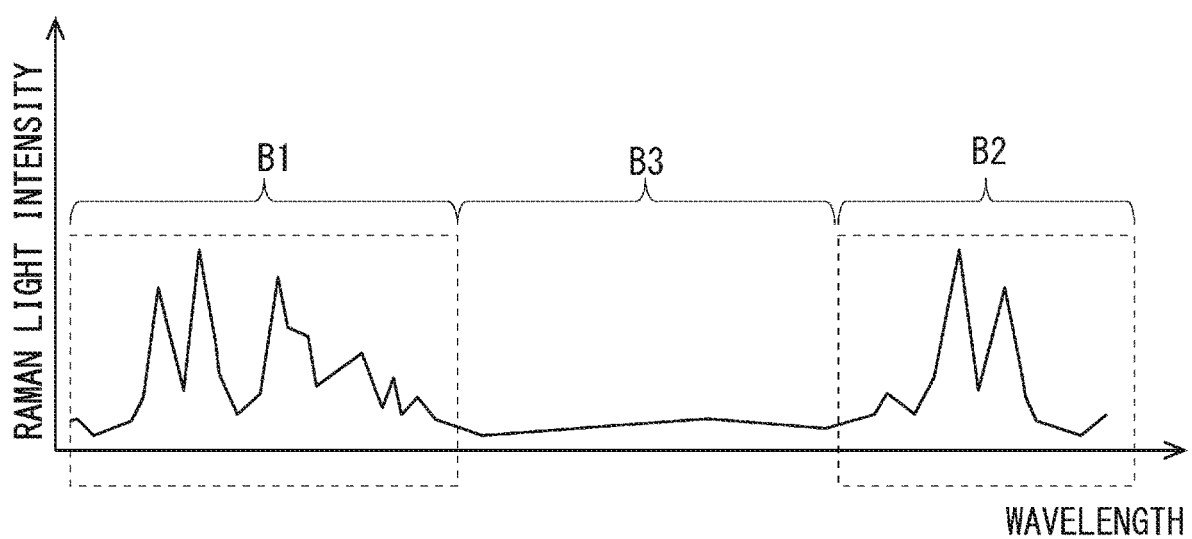
FIG. 6 is a diagram showing a spectrum measured by the spectroscopic microscope.

FIG. 6 is a diagram for explaining a Raman spectrum when the wavelength range is changed. In FIG. 6, the two wavelength ranges selected by the wavelength selection part 41 are referred to as a first wavelength range B1 and a second wavelength range B2. The wavelength range between the first wavelength range B1 and the second wavelength range B2 is referred to as a third wavelength range B3. The third wavelength range B3 is a wavelength range in which spectrum measurement is unnecessary.

First, the optical filter is set so that the wavelength selection part 41 selects the first wavelength range B1. The low-pass filter 42 and the bandpass filter 43 of the wavelength selection part 41 transmit light in the wavelength range B1 and block light in wavelength ranges other than the wavelength range B1. When the spectrometer 60 detects the signal light L4, the Raman spectrum in the first wavelength range B1 is measured.

Next, the wavelength range to be selected by the wavelength selection part 41 is changed from the first wavelength range B1 to the second wavelength range B2. The low-pass filter 42 and the bandpass filter 43 of the wavelength selection part 41 transmit light in the wavelength range B2 and block light in wavelength ranges other than the wavelength range B2. Then, when the spectrometer 60 detects the signal light L4, the Raman spectrum in the second wavelength range B2 is measured.

Thus, it is possible to measure the spectrum only in the wavelength range to be measured. That is, it is possible to measure only the first wavelength range B1 and the second wavelength range B2 to be measured without measuring the unnecessary third wavelength range B3. For example, a Raman spectrum has a wavelength range (wavenumber range) called a silent region in which scattering light does not occur. It is possible to measure the Raman spectrum from which the third wavelength range B3 as a silent region is removed. That is, it is possible to measure the spectrum in a wavelength range higher than the third wavelength range B3 and the Raman spectrum in the wavelength range B1 lower than the third wavelength range B3. Accordingly, it is possible to efficiently measure the Raman spectrum.

Note that, the two or more wavelength ranges B1 and B2 to be measured do not continue in FIG. 6, but may continue. Note that, when the wavelength range to be selected by the wavelength selection part 41 is changed, the optical path in the spectral part 61 may be adjusted so that the spectrometer 60 measures the spectrum in a desired wavelength range. Since the wavelength selection part 41 is only required to be arranged in the optical path from the edge filter 31 to the spectrometer 60, the position of the wavelength selection part 41 is not limited to the position shown in FIG. 2.

Modified Example 1

Figure 7:
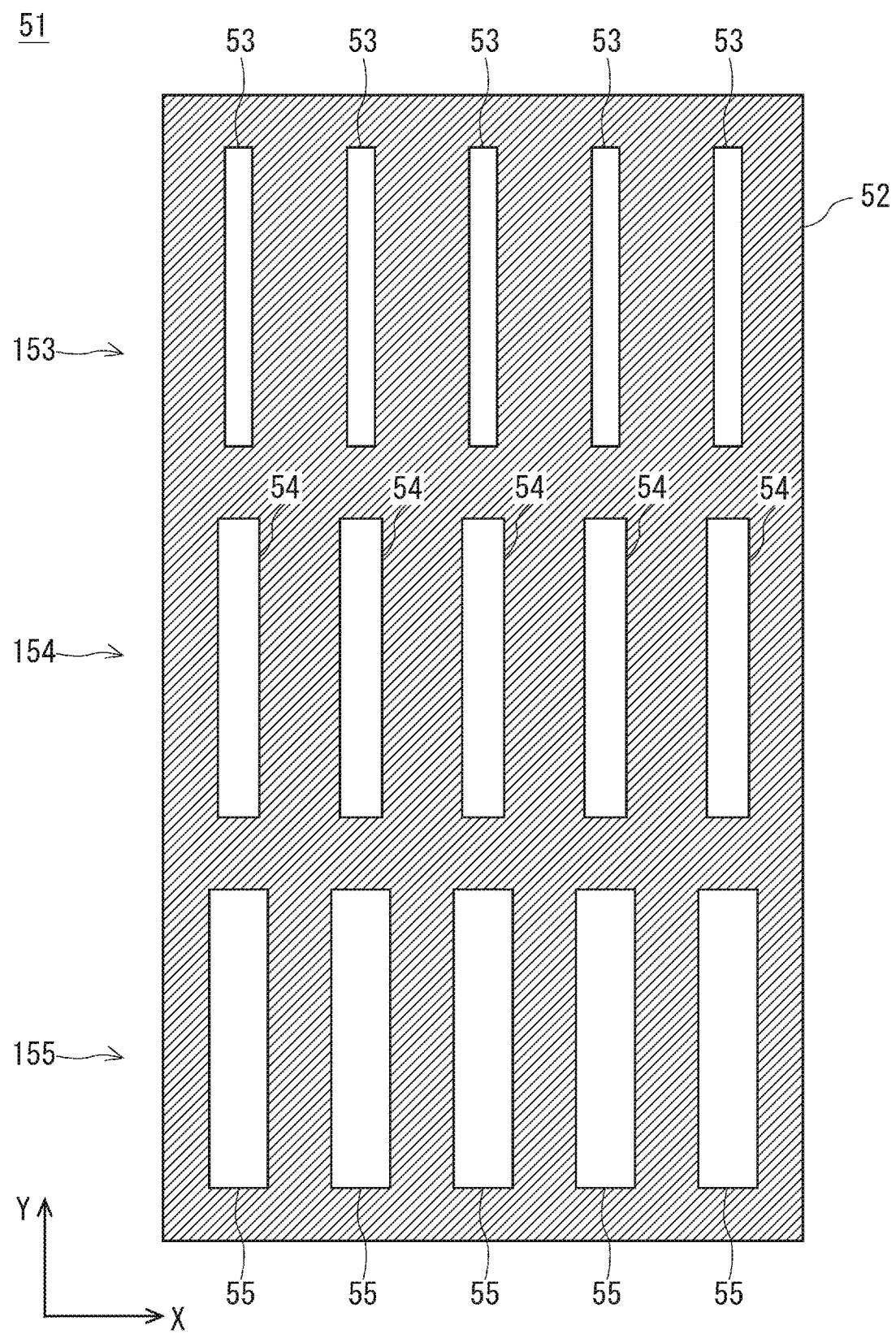
FIG. 7 is a plan view schematically showing the structure of a multi-slit in a modified example 1.

Next, a modified example 1 of the first embodiment is described with reference to FIG. 7. FIG. 7 is a plan view showing the structure of a multi-slit part 51 used in the modified example 1. The multi-slit part 51 includes a slit plate 52, a first slit group 153, a second slit group 154, and a third slit group 155. Note that, the configuration except for the multi-slit part 51 is similar to that of the spectroscopic microscope 100, and the description thereof is omitted.

In order to vary the slit width, the first slit group 153, the second slit group 154, and the third slit group 155 are formed in the slit plate 52. The positions of the first slit group 153, the second slit group 154, and the third slit group 155 are different from each other in the Y direction. That is, the second slit group 154 is arranged between the first slit group 153 and the third slit group 155 in the Y direction. The front face of the multi-slit part 51 is arranged so as to be movable in the XY directions.

The first slit group 153 includes a plurality of slits 53. The slits 53 have its slit length direction in the Y direction and its slit width direction in the X direction. The slits 53 are arranged at equal intervals in the X direction.

The second slit group 154 includes a plurality of slits 54. The third slit group 155 similarly includes a plurality of slits 55. The first slit group 153, the second slit group 154, and the third slit group 155 have the same number of slits. The slits 53, the slits 54, and the slits 55 have the same slit length. In each of the first slit group 153, the second slit group 154, and the third slit group 155, the pitch of the slits is equal.

The slits 53, the slits 54, and the slits 55 are different from each other only in the slit widths. The slit width of the slits 54 is wider than that of the slits 53 and narrower than that of the slits 55. Then, the multi-slit part 51 is arranged on the incident side of the spectrometer 60 so as to be movable in the XY plane. One slit group of the first slit group 153, the second slit group 154, and the third slit group 155 is arranged in the optical path of the signal light L4. One slit group of the first slit group 153, the second slit group 154, and the third slit group 155 is selectively used for spectroscopic measurement. Thus, the slits having the same slit width are used for spectroscopic measurement.

Thus, it is possible to vary the wavelength resolution. For example, to enhance the wavelength resolution, the first slit group 153 having the narrow width is arranged on the incident side of the spectrometer 60. That is, the multi-slit part 51 is arranged so that the signal light L4 enters only the first slit group 153. Thus, the signal light L4 does not enter the second slit group 154 and the third slit group 155. Then, the signal light L4 having passed through the slits 53 is detected by the spectrometer 60.

On the other hand, to lower the wavelength resolution, the third slit group 155 having the wide width is arranged on the incident side of the spectrometer 60. Thus, the signal light L4 having passed through the slits 55 having the wide width is detected by the spectrometer 60. The slit width is set according to the intensity of the signal light L4 and the wavelength resolution. That is, the third slit group 155 having the wide width is used when the intensity of the signal light L4 is low, and the first slit group 153 having the narrow width is used when the intensity of the signal light L4 is high. Then, the slit plate 52 is moved in the Y direction to change the slit width. It is possible to appropriately change the slit width according to the intensity of the signal light L4 and the resolution.

Note that, the multi-slit part 51 in which the slits 53 to 55 having the three different slit widths are formed is described with reference to FIG. 7, but the number of slit widths to be changed may be two or four or more. That is, at least the first slit group 153 including the slits 53 having a first slit width and the second slit group 154 including the slits 54 having a second slit width wider than the first slit width are only required to be formed in the slit plate 52. By moving the slit plate 52, a condition in which the signal light L4 passes through the slits 53 of the first slit group 153 and enters the spectrometer 60 and a condition in which the signal light L4 passes through the slits 54 of the second slit group 154 and enters the spectrometer 60 are switched. One of a plurality of slit groups is selectively used for spectroscopic measurement. Accordingly, it is possible to change the wavelength resolution with a simple configuration.

In addition, slit groups having a different slit interval and a different number of slits as well as a different slit width may be prepared. Accordingly, it is possible to easily adjust the slit interval and the number of slits.

Figure 8:
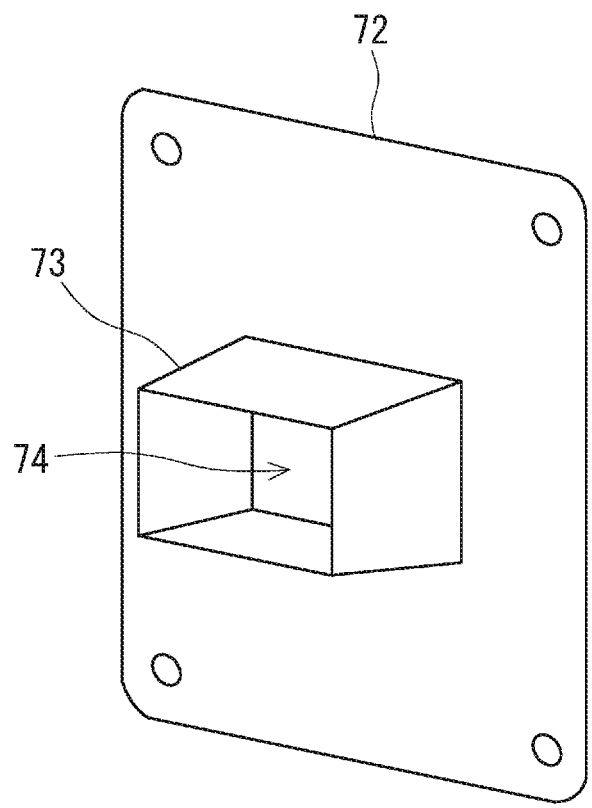
FIG. 8 is a perspective view showing a mask arranged on the incident side of the multi-slit part.
Figure 8:
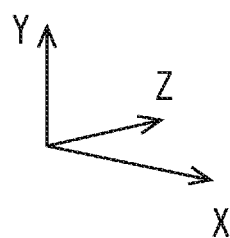

Furthermore, a shielding mask 70 as shown in FIG. 8 may be arranged on the front face of the multi-slit part 51. FIG. 8 is a perspective view showing the structure of the shielding mask 70. By arranging the shielding mask 70 on the incident side of the multi-slit part 51, it is possible to reduce the noise caused by stray light.

The shielding mask 70 includes a shielding plate 72 having an opening 74. The opening 74 has a rectangular shape in the XY plane. The shielding mask 70 is fixed so that the opening 74 is arranged on the incident side of the spectrometer 60. In addition, a hood 73 projecting in the −Z direction is provided around the opening 74. The hood 73 is provided on the four sides of the opening 74.

For example, when the second slit group 154 is used for spectroscopic measurement, the second slit group 154 is arranged behind the opening 74. The shielding plate 72 is positioned in the front of the first slit group 153 and the third slit group 155. Thus, the light that passes through the first slit group 153 and the third slit group 155 and enters the spectrometer 60 is blocked by the shielding plate 72. Accordingly, it is possible to prevent stray light that becomes noise from entering the spectrometer 60 through the slits 53 and the slits 55. By providing the hood 73, it is possible to prevent stray light from entering the first slit group 153 and the third slit group 155 from the opening 74 in an oblique direction. Thus, it is possible to effectively reduce noise.

Note that, the multi-slit part 51 may be constituted by a liquid crystal panel to change the wavelength resolution. That is, as the multi-slit part 51, a liquid crystal panel in which a plurality of pixels is arranged in an array is arranged on the incident side of the spectrometer 60. Then, the slit width through which light passes is changed by an electrical signal for controlling the transmittance of each pixel. In this case, it is possible to freely change the width, the interval, and the number of the slits 53 according to an application.

Second Embodiment

Figure 9:
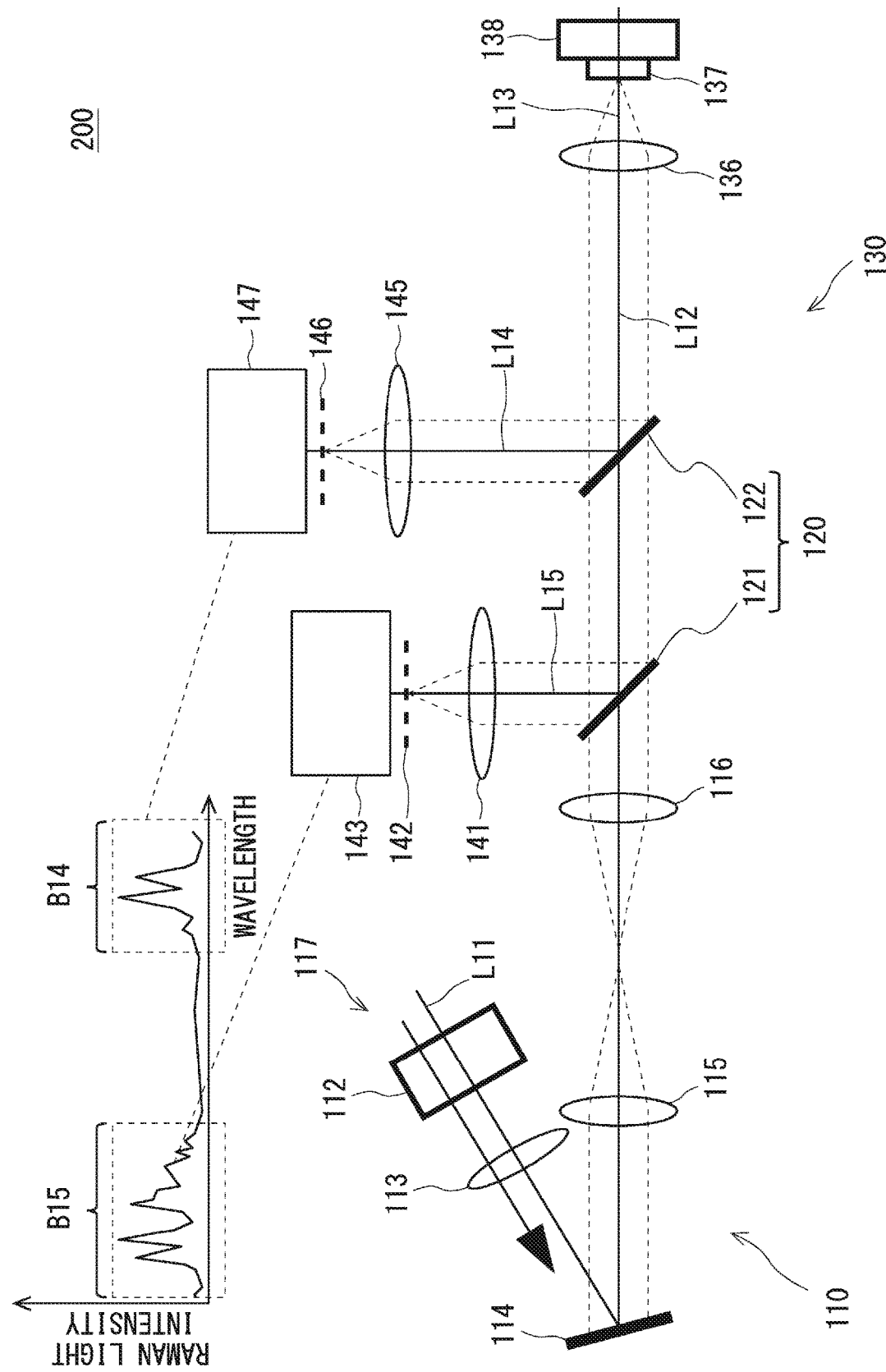
FIG. 9 is a diagram showing a spectroscopic microscope according to a second embodiment.

A spectroscopic microscope according to a second embodiment is described with reference to FIG. 9. FIG. 9 is a diagram showing a configuration of an optical system of a spectroscopic microscope 200. Note that, in the spectroscopic microscope 200 according to the present embodiment, a sample 137 is illuminated with multi-line illumination similarly to the spectroscopic microscope 100 according to the first embodiment. Then, the Raman scattering light generated at a plurality of linear illumination regions of the sample enters a spectrometer through multi-slit parts 142 and 146. In the present embodiment, similar explanation to the first embodiment is appropriately omitted, and the illustration of a part of the configuration is further omitted.

The present embodiment is different from the spectroscopic microscope according to the first embodiment in that the spectroscopic microscope 200 includes two multi-slit parts 142 and 146 and two spectrometers 143 and 147. In addition, the present embodiment is different from the spectroscopic microscope 100 according to the first embodiment in that a spatial phase modulator 112 and a DMD 114 instead of the cylindrical lens array 20 are used as a means for forming multi-line illumination.

The spectroscopic microscope 200 according to the second embodiment includes a spatial phase modulator 112, a lens 113, a Digital Micromirror Device (DMD) 114, a lens 115, a lens 116, a first dichroic mirror 121, a second dichroic mirror 122, an objective lens 136, a lens 141, a first multi-slit part 142, a first spectrometer 143, a lens 145, a second multi-slit part 146, and a second spectrometer 147.

The spatial phase modulator 112, the lens 113, the DMD 114, the lens 115, the lens 116, the first dichroic mirror 121, the second dichroic mirror 122, and the objective lens 136 constitute an illumination optical system 110. The objective lens 136, the first dichroic mirror 121, the second dichroic mirror 122, the lens 141, the first multi-slit part 142, the lens 145, and the second multi-slit part 146 constitute a detection optical system 130.

Laser light L11 from a laser light source (not shown in FIG. 9) enters the spatial phase modulator 112. The spatial phase modulator 112 is, for example, a liquid crystal panel having a plurality of pixels. Each pixel of the spatial phase modulator 112 modulates the phase of the laser light L11 according to a control signal.

The laser light L11 having passed through the spatial phase modulator 112 enters a DMD 114 through the lens 113. The DMD 114 is a spatial amplitude modulator and modulates the amplitude of the laser light L11. The DMD 114 includes a plurality of micro mirrors. The micro mirrors are arranged in an array to be pixels. Then, a control signal drives the electrodes, and an ON state and an OFF state of each micro mirror is independently controlled. Accordingly, it is possible to control the reflection pattern of the DMD 114.

The DMD 114 reflects the laser light L11 so that the linear illumination regions on the sample 137 is illuminated with the laser light L11. By using the DMD 114 and the spatial phase modulator 112 as a spatial modulator 117, it is possible to illuminate the sample 137 with multi-line illumination. That is, the spatial modulator 117 modulates the laser light L11 according to a control signal so that the linear illumination regions on the sample 137 are illuminated with the laser light L11. Note that, either of the DMD 114 or the spatial phase modulator 112 may be used as the spatial modulator 117. In addition, the DMD 114 may be arranged at a position conjugate not with the pupil of the objective lens but with the sample 137.

The laser light L11 reflected by the DMD 114 passes through the first dichroic mirror 121 and the second dichroic mirror 122. The first dichroic mirror 121 and the second dichroic mirror 122 transmit light having the laser wavelength and reflect light having a wavelength longer than the laser wavelength. The laser light L11 having passed through the second dichroic mirror 122 is referred to as laser light L12. As to be described later, the first dichroic mirror 121 and the second dichroic mirror 122 constitute a wavelength selection part 120.

Then, the laser light L12 having passed through the first dichroic mirror 121 and the second dichroic mirror 122 is condensed by the objective lens 136 and enters the sample 137. Similarly to the first embodiment, the linear illumination regions on the sample 137 are illuminated. The sample 137 is placed on a stage 138. The stage 138 is a driving stage. By driving the stage 138 in the XY directions, it is possible to illuminate any position of the sample 137.

Raman scattering light is generated at the illumination regions of the sample 137. Here, in the Raman scattering light generated at the sample 137, the Raman scattering light that enters the objective lens 136 is referred to as signal light L13. In addition, Rayleigh scattering light having the same wavelength as the laser light L12 also enters the objective lens 136. The signal light L13 enters the second dichroic mirror 122 through the objective lens 136. The second dichroic mirror 122 is a light branching means for branching the signal light L13 from the Rayleigh scattering light according to the wavelength. In addition, the second dichroic mirror 122 reflects light having a wavelength in a part of the band of the signal light L13. The signal light L13 reflected by the second dichroic mirror 122 is referred to as signal light L14.

The signal light L14 enters the lens 145. The lens 145 is an imaging lens that condenses the signal light L14 on the second multi-slit part 146. The image of the sample 137 illuminated with the linear illumination regions is formed on the second multi-slit part 146. Then, the signal light L14 having passed through each slit of the second multi-slit part 146 is dispersed by the second spectrometer 147 and detected. Accordingly, it is possible to measure the Raman spectrum of the signal light L14.

In addition, the signal light L13 having passed through the second dichroic mirror 122 is reflected by the first dichroic mirror 121. The first dichroic mirror 121 is a light branching means for branching the optical path of the signal light L13 from that of the laser light L11 according to the wavelength. The signal light L13 reflected by the first dichroic mirror 121 is referred to as signal light L15.

Here, the second dichroic mirror 122 is different from the first dichroic mirror 121 in the wavelength characteristic. For example, the second dichroic mirror 122 reflects the light in a wavelength range B14 and transits the light in a wavelength range B15 and the light having the laser wavelength. On the other hand, the first dichroic mirror 121 reflects the light in the wavelength range B15 and transmits the light having the laser wavelength.

Accordingly, the signal light L14 reflected by the second dichroic mirror 122 is detected by the second spectrometer 147 through the second multi-slit part 146. Thus, the second spectrometer 147 measures the Raman spectrum in the wavelength range B14.

The signal light L15 reflected by the first dichroic mirror 121 is detected by the first spectrometer 143 through the first multi-slit part 142. Thus, it is possible for the second spectrometer 147 to measure the Raman spectrum in the wavelength range B15.

As describe above, the wavelength selection part 120 selects the wavelength range B14 of the signal light L14 and the wavelength range B15 of the signal light L15 with the first dichroic mirror 121 and the second dichroic mirror 122. That is, the signal light L14 in the wavelength range B14 and the signal light L15 in the wavelength range B15 is branched from each other by the wavelength selection part 120 and separately detected by the spectrometers 143 and 147.

Thus, it is possible to simultaneously measure the Raman spectrums in the two wavelength ranges B14 and B15. Thus, it is possible to increase the number of Raman spectrum points to be measured at a time, and to shorten the measurement time. In addition, it is possible to simultaneously measure the Raman spectrums in the separated two wavelength ranges B14 and B15.

The wavelength selection part 120 may select the wavelength not only with the first dichroic mirror 121 and the second dichroic mirror 122 but also with an optical filter or the like. In addition, the wavelength selection part 120 may be constituted by combining one or more dichroic mirrors and one or more optical filters.

In the case of using a single spectrometer like in the first embodiment, by separating the wavelength range (wavenumber range) in the Y direction, it is possible to reduce the number of pixels in the X direction necessary for detecting the spectrum. The optical filter is arranged so as to change the wavelength range to be a plurality of wavelength ranges in the Y direction. Specifically, the optical filter is arranged so that the wavelength of the signal light is changed by the +Y side half and the −Y side half of a slit extending in the Y direction. Accordingly, it is possible to further effectively use the limited pixels. Thus, the photodetector of the spectrometer includes a first region that detects the signal light in a first wavelength band and a second region that detects the signal light in a second wavelength band different from the first wavelength band. Then, the first region is shifted from the second region in the longitudinal direction of the slit.

Note that, instead of scanning with the stage 138, laser light may be scanned with an optical scanner, such as a galvanometer mirror. That is, in the case of forming multi-line illumination using the DMD 114 and the spatial modulator 117, it is possible to scan the multi-line illumination with an optical scanner, such as the galvanometer mirror 32 shown in FIG. 2.

(Structured illumination)

Furthermore, it is possible to perform multi-line illumination with structured illumination in the second embodiment. With structured illumination, the spatial resolution is improved. Structured illumination is detailedly disclosed in, for example, WO 2016/027453 A and Kozue Watanabe et al., "Structured line illumination Raman microscopy" Nature Communications 2015. The outline of structured illumination used in the present embodiment is described below.

Figure 10:
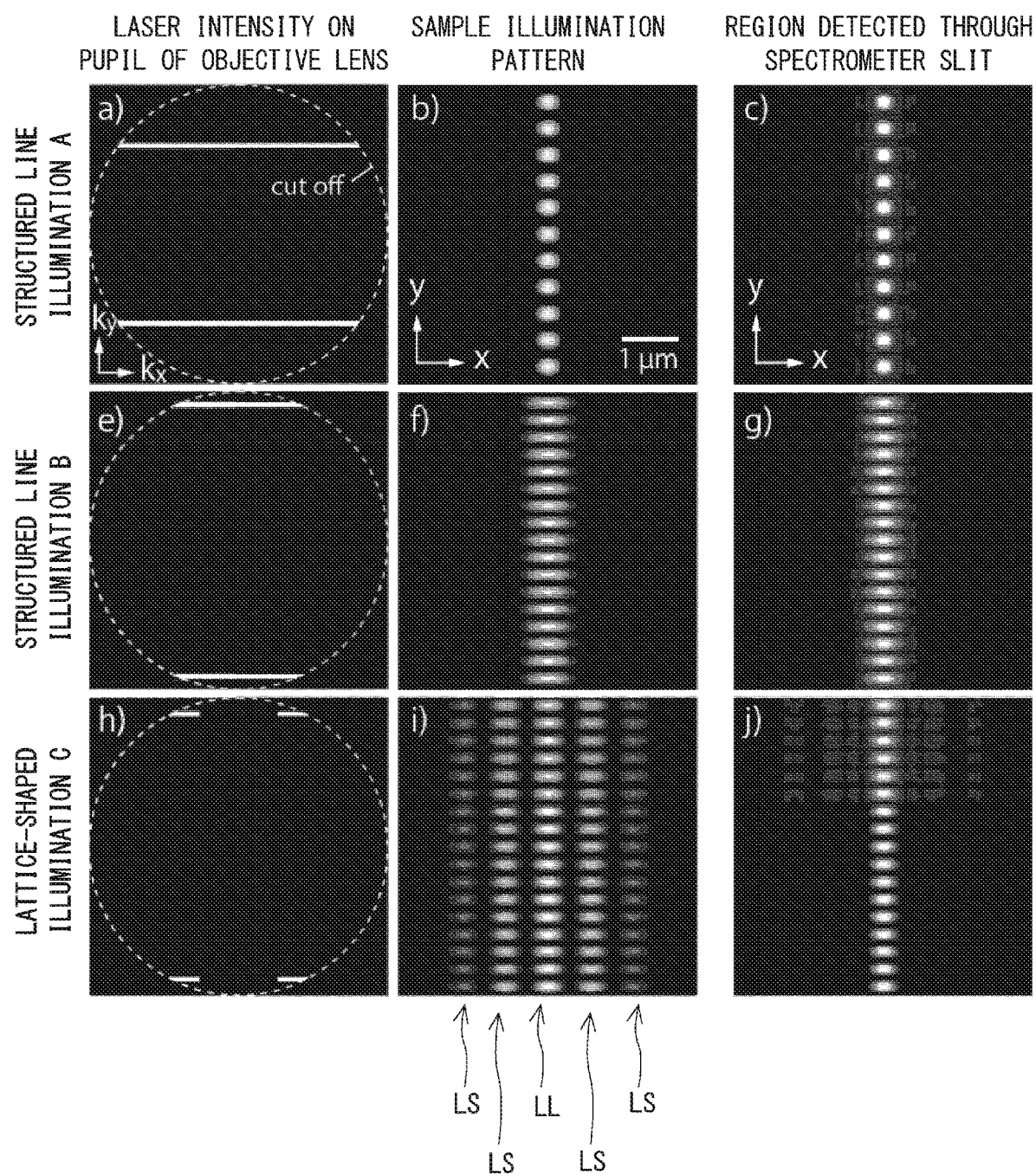
FIG. 10 is a diagram for explaining structured illumination to be used by the spectroscopic microscope.

FIG. 10 is a diagram for explaining illumination patterns of structured illumination. The left column of FIG. 10 shows the laser intensities on the pupil of the objective lens 136. The center column (second column from the left) of FIG. 10 shows illumination patterns on the sample 137. The right column of FIG. 10 shows regions detected through a slit of the multi-slit part. FIG. 10 further shows illumination patterns of structured line illumination A (the first row from the top), structured line illumination B (the second row from the top), and lattice-shaped illumination C (the first row from the bottom). In addition, the nine images are referred to as an image a, an image b, an image c, an image e, an image f, an image g, an image h, an image i, and an image j as shown in FIG. 10.

In the structured illumination A and B, line illumination having a dotted-line illumination pattern is used as shown in the image b and the image f. That is, linear illumination light has a periodic structure. The sample is illuminated with line illumination having a plurality of spots arranged in the Y direction. The spots are arranged at fixed intervals in the Y direction. Thus, it is possible to improve the spatial resolution in the direction parallel to the line illumination (the Y direction).

As shown in the image a, the image b, the image e, and the image f in FIG. 2, the fineness of the periodic structure and the width of the line (the size in the X direction) have a trade-off relation. In the structured line illumination B, while the pitch of the dotted line is narrow, each spot spreads in the X direction. Thus, it is difficult to improve the spatial resolution in the X direction and the Y direction simultaneously.

For this reason, the lattice-shaped illumination C having a lattice-shaped illumination pattern is used in the present embodiment. Accordingly, it is possible to reduce the above trade-off of the spatial resolution, and to improve the spatial resolution in the X direction. By masking low spatial frequency components in the X direction at the multi-slit part, it is possible to improve the effective spatial resolution. The cutoff frequency is not changed, but the high frequency components are emphasized, and it is possible to observe a fine structure buried in noise.

In the lattice-shaped illumination C, a large number of side lobes LS are generated in the direction perpendicular to the line illumination LL (the X direction) as shown in the image i. That is, side lobes LS are generated on both sides of the line illumination LL. The Raman scattering light generated at the side lobes LS is blocked by the multi-slit part.

Figure 11:
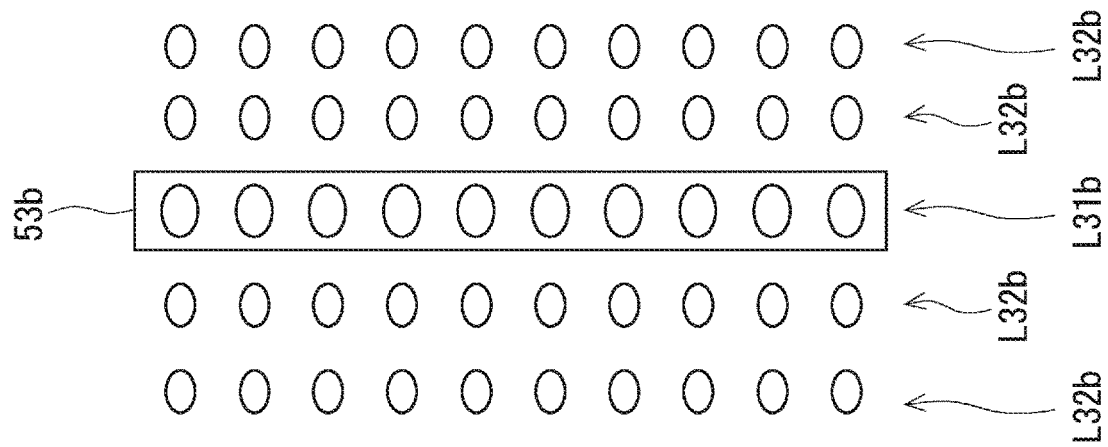
FIG. 11 is a diagram for explaining the relation between an illumination region illuminated with lattice-shaped illumination and slits of a multi-slit part.
Figure 11:
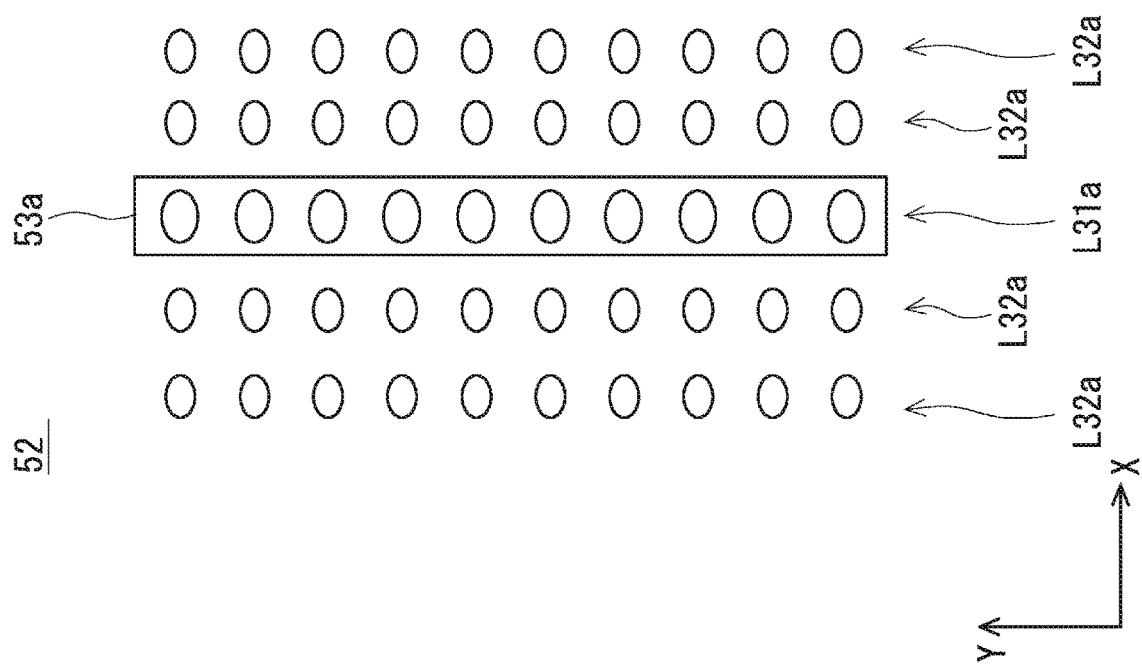

With reference to FIG. 11, the Raman scattering light that enters the multi-slit part is described. FIG. 11 schematically shows the slit plate 52 of the multi-slit part, and the Raman scattering light that enters the slits 53a and 53b. In FIG. 11, the Raman scattering light generated by the line illumination LL is referred to as Raman scattering light L31a and L31b. In addition, the Raman scattering light L31a is the Raman scattering light generated by the first line of the multi-line illumination, and the Raman scattering light L31b is the Raman scattering light generated by the second line of the multi-line illumination. The Raman scattering light L31a passes through the first slit 53a, and the Raman scattering light L31b passes through the second slit 53b.

The Raman scattering light generated by a side lobe LS is referred to as Raman scattering light L32a and L32b. The Raman scattering light L32a is the Raman scattering light generated by the side lobes LS of the first line of the line illumination LL, and the Raman scattering light L32b is the Raman scattering light generated by the side lobes LS of the second line of the line illumination LL. The Raman scattering light L32a and L32b is blocked by the slit plate 52. That is, the Raman scattering light L32a and L32b enter positions shifted from the slits 53a and 53b in the X direction and do not pass through the slits 53a and 53b.

The space between the side lobes LS and the line illumination LL on the sample is narrower than the space corresponding to the slit interval. Thus, only the Raman scattering light L31a passes through the first slit 53a, but the Raman scattering light L32a is blocked by the slit plate 52. Similarly, only the Raman scattering light L31b passes through the second slit 53b, but the Raman scattering light L32b is blocked by the slit plate 52. That is, the Raman scattering light L32a and L32b generated by the side lobes LS enters the portions other than the slits 53 and is blocked by the slit plate 52. Thus, it is possible to reduce the influence of the Raman scattering light L32a and L32b generated by the side lobes LS on the Raman spectrum. Accordingly, it is possible to improve the spatial resolution.

In the spectroscopic microscope 200 shown in FIG. 9, the DMD 114 is arranged at the position conjugate with the pupil of the objective lens 136. Then, the reflection pattern of the DMD 114, that is, the pupil function is controlled. Accordingly, it is possible to form lattice-shaped illumination having various patterns. Since the resolution of the DMD 114 is high, it is possible to set a high accurate pupil function. In addition, since the damage threshold of the DMD 114 is high, it is suitable to be combined with high intensity laser light.

On the other hand, the laser light intensity after the reflection by the DMD 114 can be significantly decreased depending on the reflection pattern. In that case, a rough intensity pattern is holographically formed on the DMD 114 using the spatial phase modulator 112. Then, the detailed pupil function is determined by the DMD 114. In this manner, lattice-shaped illumination is performed with the spatial phase modulator 112 and the DMD 114. Thus, it is possible to improve the spatial resolution in the XY directions simultaneously.

In addition, since multi-line illumination is performed, it is possible to perform high-speed imaging similarly to the first embodiment. It is possible to measure a plurality of points of an image required to construct a high-resolution observation object at a time. Accordingly, it is possible to improve the time resolution.

Note that, a grid mask or a lens array may be used to perform lattice-shaped illumination as shown in the image in FIG. 10. It is also possible to use a grid mask or a lens array instead of the DMD 114 and the spatial phase modulator 112 to form a multi spot.

Figure 12:
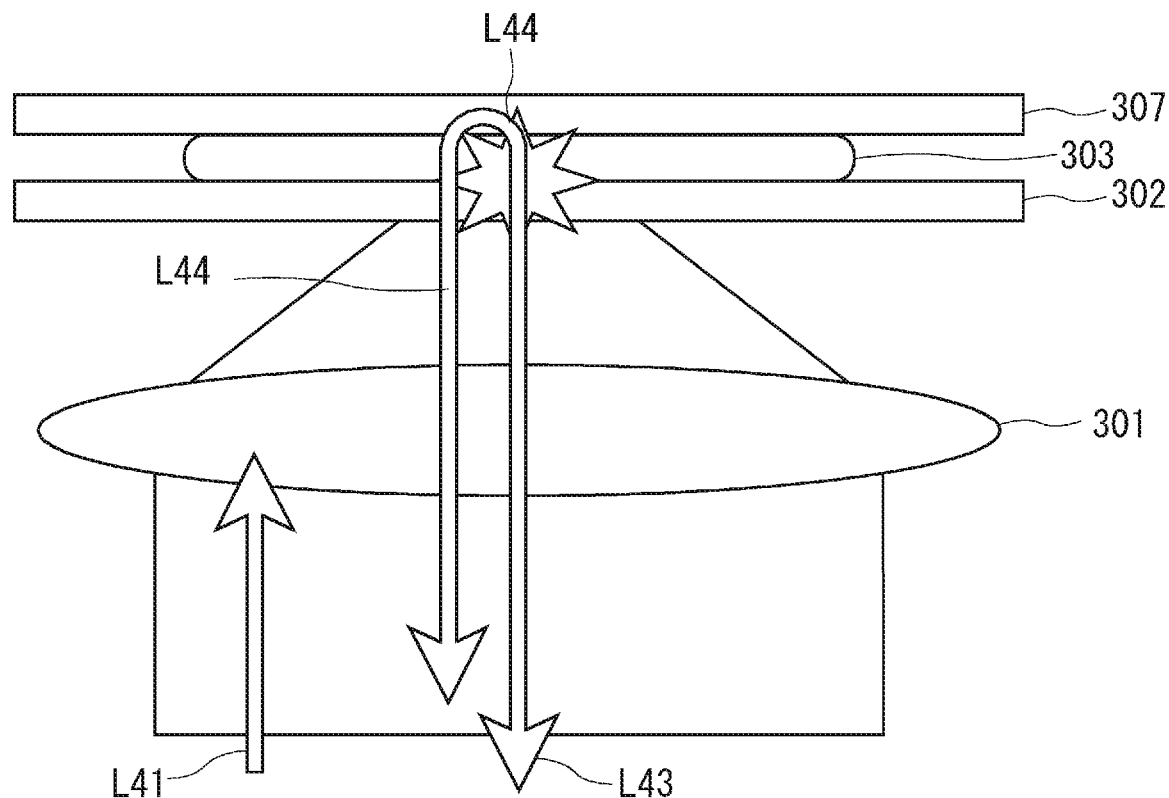
FIG. 12 is a diagram showing a main part of a spectroscopic microscope according to a third embodiment.

Third Embodiment a. A configuration of a microscope according to a third embodiment is described with reference to FIG. 12. FIG. 12 is a diagram showing a configuration of a main part of the microscope according to the third embodiment. Specifically, FIG. 12 is a diagram schematically showing a configuration around a sample 303.

The configuration in the present embodiment is applicable to the spectroscopic microscope including no multi-slit part described in the first and second embodiments. That is, the configuration in the present embodiment is also applicable to a spectroscopic microscope using single line illumination and a spectroscopic microscope using spot illumination. Furthermore, the configuration described in the present embodiment is applicable to a microscope that does not perform spectroscopic measurement. Then, the configurations of an illumination optical system and a detection optical system are not particularly limited, the illustration thereof is omitted.

Normally, Raman scattering light is emitted from an observation point of the sample 303 in all directions. However, a Raman microscope can only detect signal light having entered the objective lens. For this reason, the configuration shown in FIG. 12 is used to increase the intensity of the signal light in the present embodiment.

In FIG. 12, the sample 303 is arranged between a dichroic mirror 307 and a transparent cover glass 302. Note that, the sliced light-transmission sample 303 is observed in the present embodiment. The dichroic mirror 307 is arranged on the side of the sample 303 opposite to an objective lens 301. That is, the sample 303 is arranged between the dichroic mirror 307 and the objective lens 301. Note that, the side of the sample 303 opposite to the objective lens 301 is referred to as a transmission side, and the objective lens 301 side is referred to as a reflection side.

The objective lens 301 condenses laser light L41 from the light source. Then, the laser light L41 condensed by the objective lens 301 enters the sample 303 through the cover glass 302. Then, when the laser light L41, which is excitation light, enters the sample 303, Raman scattering light is generated at the sample 303. As described above, the Raman scattering light is emitted in all directions. Here, in the Raman scattering light generated at the sample, the Raman scattering light emitted to the reflection side is referred to as Raman scattering light L43. The Raman scattering light L43 enters the objective lens 301 through the cover glass 302. In the Raman scattering light generated at the sample, the Raman scattering light emitted to the transmission side is referred to as Raman scattering light L44. The Raman scattering light L44 is reflected by the dichroic mirror 307.

Then, the Raman scattering light L44 passes through the sample 303 and the cover glass 302 and enters the objective lens 301.

Thus, the Raman scattering light L44 emitted to the transmission side of the sample 303 and the Raman scattering light L43 emitted to the reflection side of the sample 303 propagate through the common detection optical system. With this configuration, it is possible to detect the Raman scattering light L44 emitted to the transmission side of the sample 303 and the Raman scattering light L43 emitted to the reflection side with the same photodetector. Thus, it is possible to increase the intensity of the signal light.

Note that, an ordinary reflection mirror may be used instead of the dichroic mirror 307. In this case, although the laser light L41 having passed through the sample 303 is reflected by the mirror and returns to the objective lens 301, the return light of the laser light L41 is branched from the Raman scattering light by the edge filter 31 or the dichroic mirror 122 provided in the detection optical system. The dichroic mirror 307 or the mirror is used as the stage of the sample 303. That is, the sample 303 is only required to be arranged on the dichroic mirror 307 or the mirror.

Modified Example 2

Figure 13:
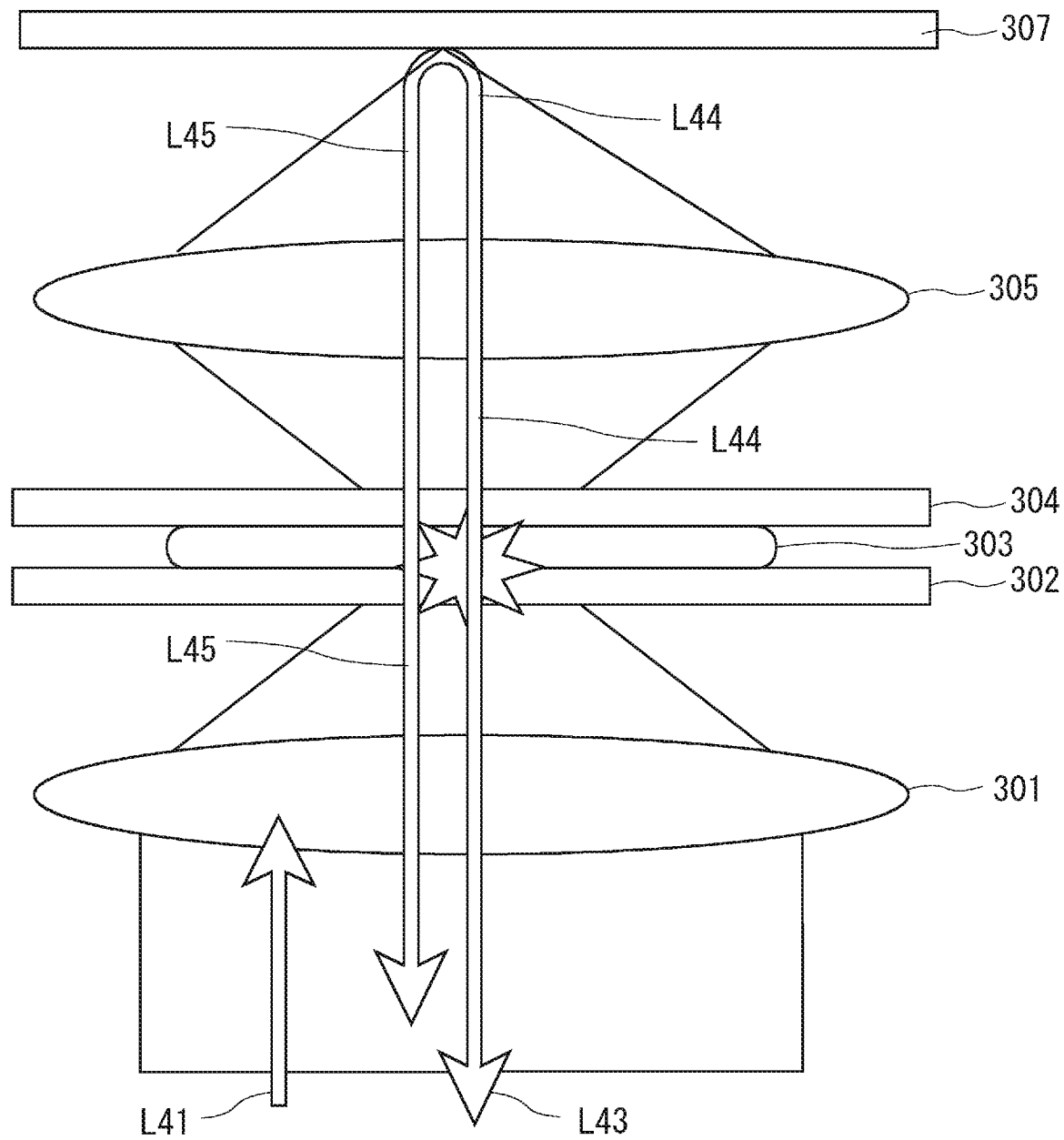
FIG. 13 is a diagram showing a main part of a spectroscopic microscope in a modified example 2 according to the third embodiment.

A modification of the third embodiment is described with reference to FIG. 13. FIG. 13 is a diagram showing a configuration of a main part of a microscope according to a modified example 2. Note that, the description of the configuration common to that in FIG. 12 is appropriately omitted.

A sample 303 is arranged between a transparent cover glass 302 and a transparent cover glass 304. In addition, an objective lens 305 as the transmission side is arranged on the side of the sample 303 opposite to an objective lens 301. That is, the sample 303 is arranged between the objective lens 301 as the reflection side and the objective lens 305 as the transmission side. The objective lens 305 as the transmission side is arranged between the cover glass 304 and a dichroic mirror 307.

The laser light L41, which is excitation light, is condensed by the objective lens 301 on the sample 303. Then, Raman scattering light is generated at the sample 303. In the Raman scattering light generated at the sample 303, the Raman scattering light generated on the objective lens 301 side is referred to as Raman scattering light L43, and the Raman scattering light generated on the objective lens 305 side is referred to as Raman scattering light L44. The Raman scattering light L43 enters the objective lens 301 through the cover glass 302.

The Raman scattering light L44 enters the objective lens 305 through the cover glass 304. The Raman scattering light L44 condensed by the objective lens 305 is reflected by the dichroic mirror 307. The Raman scattering light L44 reflected by the dichroic mirror 307 is referred to as Raman scattering light L45.

The Raman scattering light L45 is condensed by the objective lens 305. The Raman scattering light L45 refracted by the objective lens 305 enters the objective lens 301 through the cover glass 304, the sample 303, and the cover glass 302. Thus, the Raman scattering light L43 and the Raman scattering light L45 propagate through the common detection optical system. With this configuration, it is possible to detect the Raman scattering light L45 and the Raman scattering light L43 with the same photodetector. Thus, it is possible to increase the intensity of the signal light.

In the present embodiment, the microscope includes the objective lens 301 that condenses the laser light L41, which is excitation light, on the sample 303 and the mirror arranged on the side of the sample 303 opposite to the objective lens 301. Then, the mirror reflects, toward the objective lens 301, the Raman scattering light L44 emitted from the sample to the side opposite to the objective lens 301.

Accordingly, the Raman scattering light L44 emitted to the transmission side of the sample 303 and the Raman scattering light L43 emitted to the reflection side of the sample 303 enter the common objective lens 301. Thus, the Raman scattering light L43 and the Raman scattering light L44 are detected by the photodetector through the common detection optical system. Thus, it is possible to increase the intensity of the Raman scattering light to be detected by the photodetector.

Note that, it is preferable that the mirror arranged on the side of the sample 303 opposite to the objective lens 301 is the dichroic mirror 307. Accordingly, it is possible to reduce the influence of the return light of the laser light L41. For example, it is possible to prevent the Raman scattering light from being generated by the return light of the laser light L41 reflected by a reflection member, such as a mirror. The return light of the laser light L41 may be removed by arranging an optical filter between the objective lens 305 and the reflection member.

Fourth Embodiment

Figure 14:
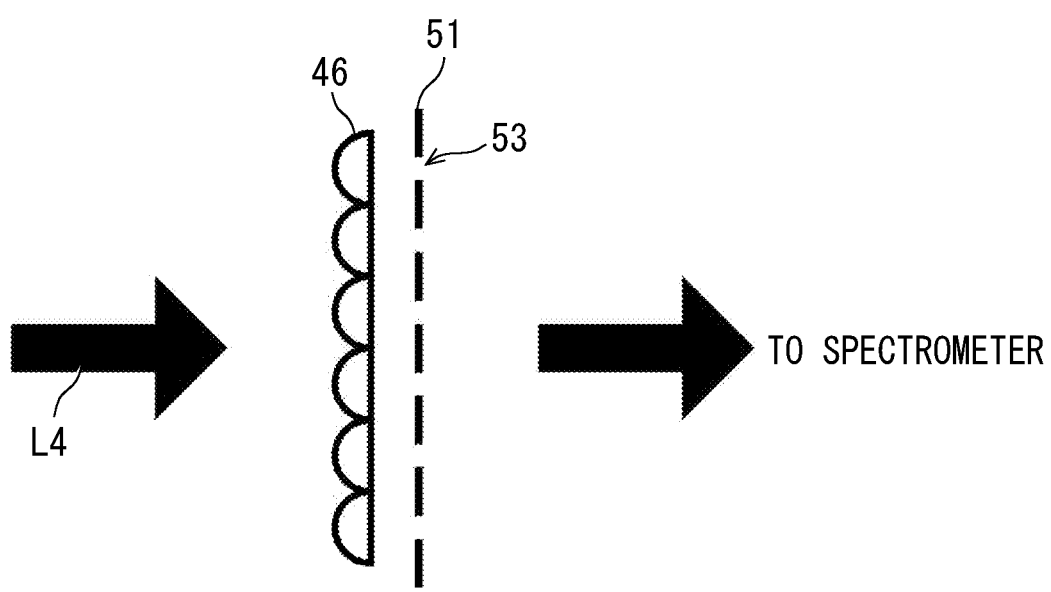
FIG. 14 is a diagram showing the arrangement of a cylindrical lens array in a spectroscopic microscope according to a fourth embodiment.

In the present embodiment, a cylindrical lens array 46 is arranged in front of a multi-slit part 51 as shown in FIG. 14. A basic configuration of the spectroscopic microscope is similar to that of the spectroscopic microscope 100 shown in FIG. 2, and the description thereof is omitted.

As shown in FIG. 14, the cylindrical lens array 46 is arranged on the incident side of the multi-slit part 51. Thus, the signal light L3 enters the multi-slit part 51 through the cylindrical lens array 46. Each cylindrical lens of the cylindrical lens array 46 has its longitudinal direction in the Y direction (the direction perpendicular to the sheet of the drawing). A plurality of cylindrical lenses provided in the cylindrical lens array 46 is arranged in the X direction (the vertical direction of the sheet).

Then, each cylindrical lens of the cylindrical lens array 46 condenses the signal light L4 in the X direction. Each cylindrical lens of the cylindrical lens array 46 condenses the light to the corresponding slit 53. The signal light L4 condensed by the cylindrical lens array 46 enters the multi-slit 51. Then, the signal light L4 having passed through the slits 53 is detected by a spectrometer 60.

Figure 15:
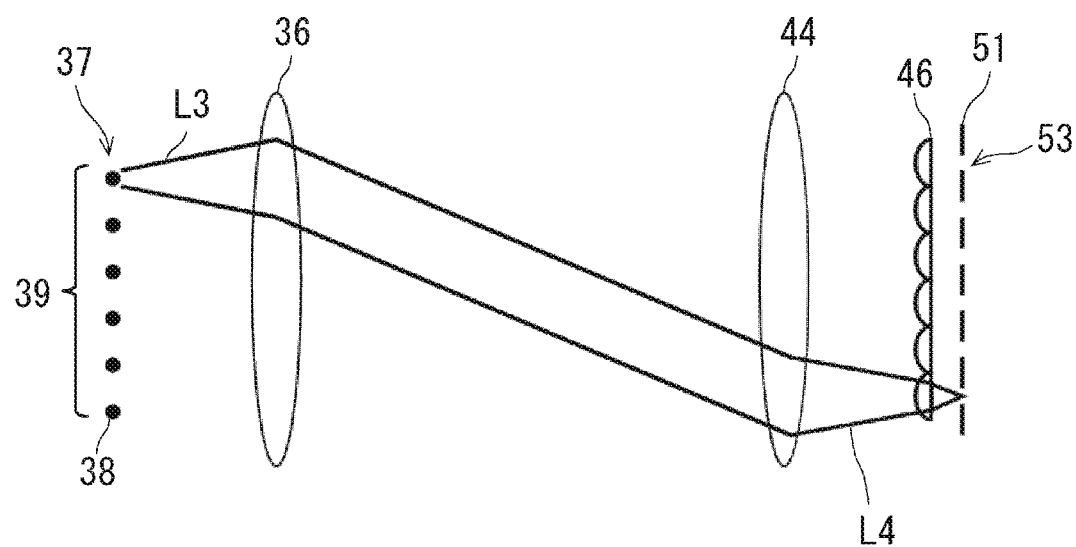
FIG. 15 is a diagram showing a simplified detection optical system in which a cylindrical lens array is arranged on the incident side of a multi-slit part.

FIG. 15 shows a simplified detection optical system 40 using the cylindrical lens array 46. FIG. 15 only shows an objective lens 36, the cylindrical lens 46, and the multi-slit part 51 of the detection optical system 40, and the other optical elements are omitted. That is, the edge filter 31, the wavelength selection part 41, and the like shown in FIG. 2 are omitted.

A sample 37 is illuminated with linear illumination regions 39. Each line 38 of the illumination regions 39 has its longitudinal direction in the direction perpendicular to the sheet. Then, the signal light L3 generated from each line 38 of the illumination regions 39 enters the objective lens 36. The signal light L4 from the objective lens 36 is condensed by an imaging lens 44 and enters the cylindrical lens array 46. The cylindrical lens array 46 condenses the signal light L4 on the slits 53 of the multi-slit part 51. Then, the signal light L4 having passed through the slits 53 is detected by the spectrometer 60.

By arranging the cylindrical lens array 46 on the incident side of the multi-slit part 51, it is possible to increase the condensing angle to the spectrometer 60. Thus, it is possible to increase the wavenumber resolution and the number of wavenumber pixels to be measured. In addition, the cylindrical lens array 46 described in the present embodiment is not limited to the multi-line illumination described in the first and second embodiments, and may be combined with the lattice-shaped illumination described in the third embodiment.

Modified Example 3

Figure 16:
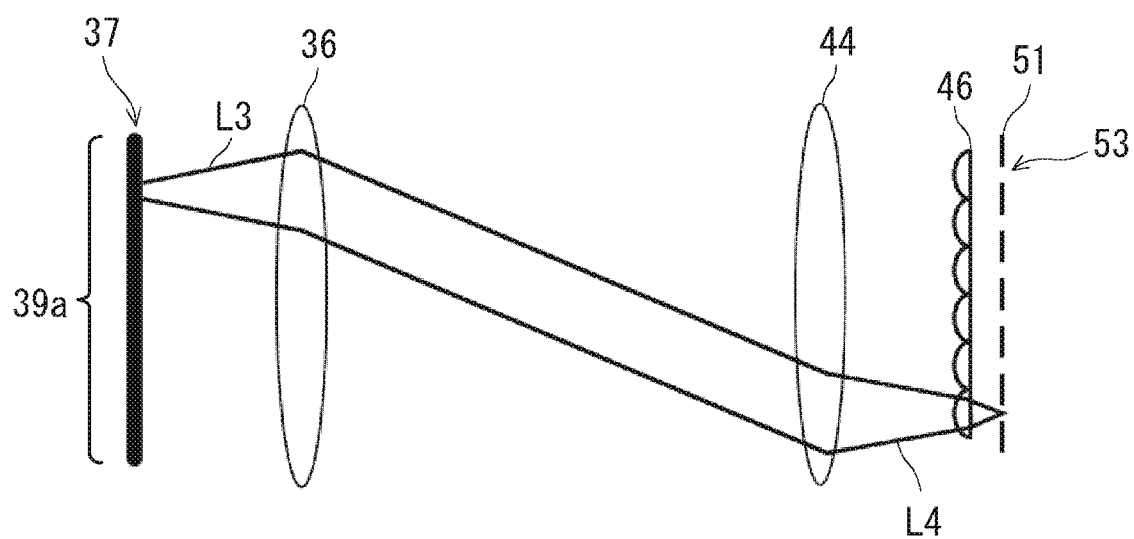
FIG. 16 is a diagram showing a simplified optical system in a modified example 3 according to the fourth embodiment.

A modified example 3 of the fourth embodiment is described with reference to FIG. 16. FIG. 16 is a diagram showing a simplified configuration of a detection optical system of a spectroscopic microscope according to the modified example 3. The illumination regions have been described as multi-line illumination in the fourth embodiment, but the modified example 3 is different from the fourth embodiment in that an illumination region is uniform illumination 39a.

Specifically, by removing the cylindrical lens array 20 from the spectroscopic microscope 100 shown in FIG. 2, uniform illumination is formed on the sample 37. Thus, the illumination region 39a of the sample 37 is uniformly illuminated. The illumination region 39a is a two-dimensional region extending in the X direction as well as in the Y direction. Then, the two-dimensional illumination region 39 is evenly illuminated.

If the signal light L3 is generated from the entire sample 37, by using the cylindrical lens 46, it is possible to generate the light distribution separated in the X direction. Thus, it is possible to simultaneously obtain the spectrum and the spatial distribution with the spectrometer 60.

Fifth Embodiment

Figure 17:
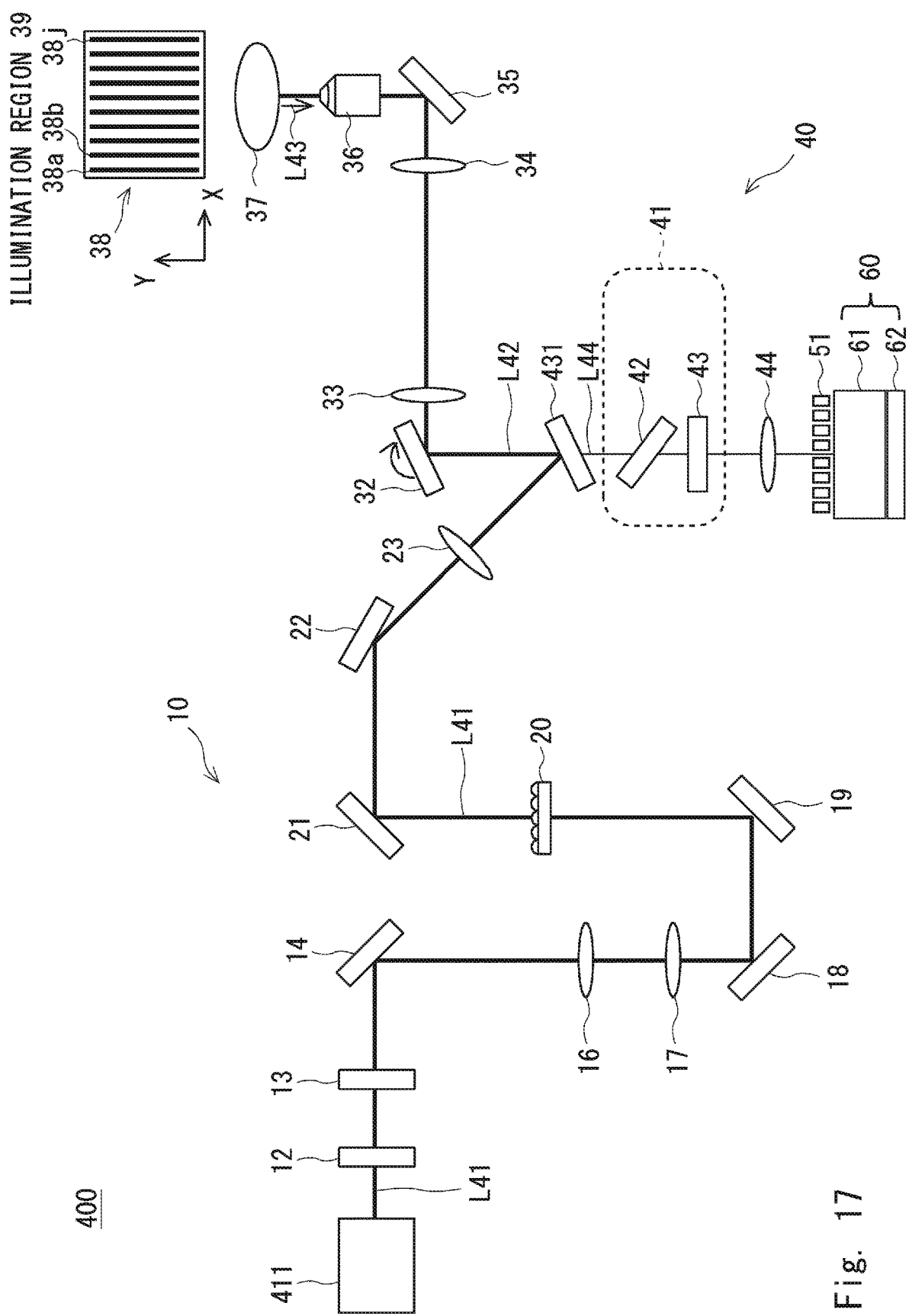
FIG. 17 is a diagram showing a configuration of a spectroscopic microscope according to a fifth embodiment.

A spectroscopic microscope according to a fifth embodiment is described with reference to FIG. 17. FIG. 17 is a diagram showing a spectroscopic microscope 400 according to the present embodiment. The spectroscopic microscope 400 according to the present embodiment is to measure not the Raman spectrum but the reflection spectrum from a sample. Thus, the light source 11 and the edge filter 31 in the configuration described in the second embodiment shown in FIG. 2 are replaced with a white light source 411 and a beam splitter 431 respectively. In addition, the laser line filter 15 is removed from the optical path. Note that, the description of the configuration similar to that in the first embodiment is appropriately omitted.

The white light source 411 is, for example, a lamp light source, a single-mode supercontinuum light source, or the like, and generates white light L41 that becomes illumination light. The edge filter 31 is replaced with the beam splitter 431. The sample 37 is illuminated with white light L42 reflected by the beam splitter 431. The multi-line illumination is performed with the white light L42 similarly to the first embodiment. The white light is reflected by the sample 37 and becomes signal light L43. The signal light L43 has the reflection spectrum according to the sample 37.

Then, the signal light L43 passes through the beam splitter 431 and becomes the signal light L44. The wavelength band of the signal light L44 is selected by a wavelength selection part 41, and the signal light L44 enters the multi-slit part 51. Then, the signal light L44 having passed through the multi-slit part 51 is spectroscopic-measured by a spectrometer 60.

Thus, it is possible to efficiently measure the reflection spectrum of the sample 37. In the present embodiment, a light branching means (the edge filter 31 or the like) for separating excitation light L2 from the signal light L3 according to the wavelength is not provided. Note that, if the spatial resolution in the depth direction is unnecessary, the sample may be uniformly illuminated with white light without performing multi-line illumination.

Sixth Embodiment

Figure 18:
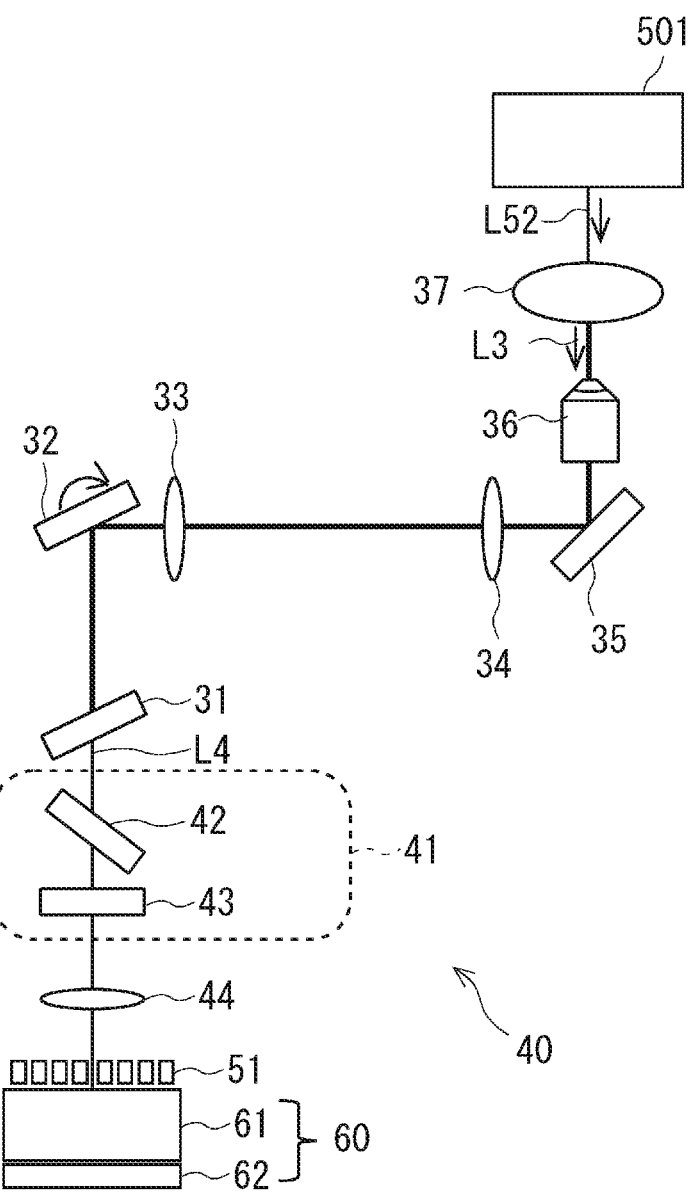
FIG. 18 is a diagram showing a configuration of a spectroscopic microscope according to a sixth embodiment.

A spectroscopic microscope according to a sixth embodiment is described with reference to FIG. 18. FIG. 18 is a diagram showing a configuration of a spectroscopic microscope 500. The spectroscopic microscope 500 includes a transmission illumination optical system 501 that performs transmission spectroscopic imaging. The transmission illumination optical system 501 irradiates a sample 37 with excitation light L52 from the side of the sample 37 opposite to the objective lens 36.

Note that, the configuration except for the transmission illumination optical system 501, such as the detection optical system 40, is similar to that in FIG. 2, and the description thereof is omitted. The transmission illumination optical system 501 performs multi-line illumination with laser light L52. Note that, the transmission illumination optical system 501 is capable of performing multi-line illumination with a method similar to that described in the first to third embodiments, and the detailed description thereof is omitted. Then, the spectrometer 60 detects the signal light L4 from the sample 37. Thus, it is possible to spectroscopic-measure the Raman scattering light having passed through the sample 37. Alternatively, the sample may be uniformly illuminated without performing multi-line illumination. In addition, the transmitted light may be spectroscopic-measured using white light from the light source. Alternatively, by inserting a polarizing plate and a Differential interference contrast (DIC) prism between the light source and the sample and between the objective lens 36 and the multi-slit 51, differential interference observation may be performed. Alternatively, by inserting an annular mask between the light source and the sample and inserting a phase plate between the objective lens 36 and the multi-slit 51, phase difference observation may be performed.

Seventh Embodiment

In a seventh embodiment, a configuration for uniformizing the spatial distribution of the laser light L2 that enters a sample 37 is added to the spectroscopic microscope 100 in FIG. 2. For example, a configuration for scanning the laser light L1 during an exposure time of a photodetector 62 is added. The configuration except for the configuration for scanning the laser light L1 is similar to that in FIG. 2, and the description thereof is omitted.

Figure 19:
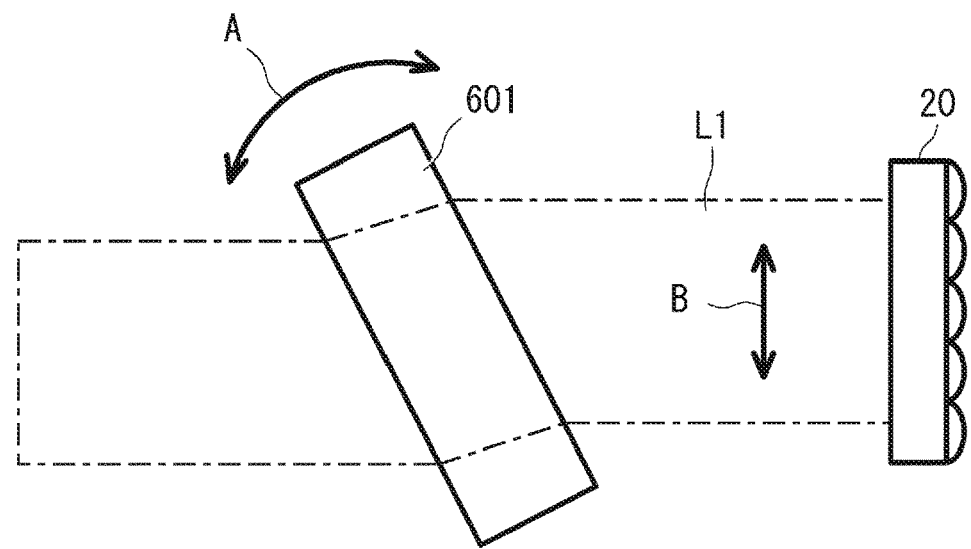
FIG. 19 is a diagram showing a configuration of a spectroscopic microscope according to a seventh embodiment.

Specifically, a transparent parallel flat plate 601 is arranged in front of a cylindrical lens 20 as shown in FIG. 19. The parallel flat plate 601 has a flat incident-side face and a flat emission-side face that are parallel to each other. The laser light L1 having passed through the parallel flat plate 601 enters the cylindrical lens array 20. The parallel flat plate 601 is attached to an actuator, such as a motor, so as to change the angle of the incident face.

Then, the parallel flat plate 601 moves in the direction of the arrow A during an exposure time of the photodetector 62. That is, by changing the inclination of the parallel flat plate 601, the laser light L1 is scanned in the direction of the arrow B. While the angle of the laser light L1 is maintained, the incident position on the cylindrical lens array 20 is changed. Thus, it is possible to substantially uniformize the multi-line illumination entering the sample 37. Note that, FIG. 19 only shows scanning in the sheet, but it is preferable to similarly perform scanning in the sheet depth direction. Accordingly, it is possible to further uniformize the multi-line illumination.

Modified Example 4

Figure 20:
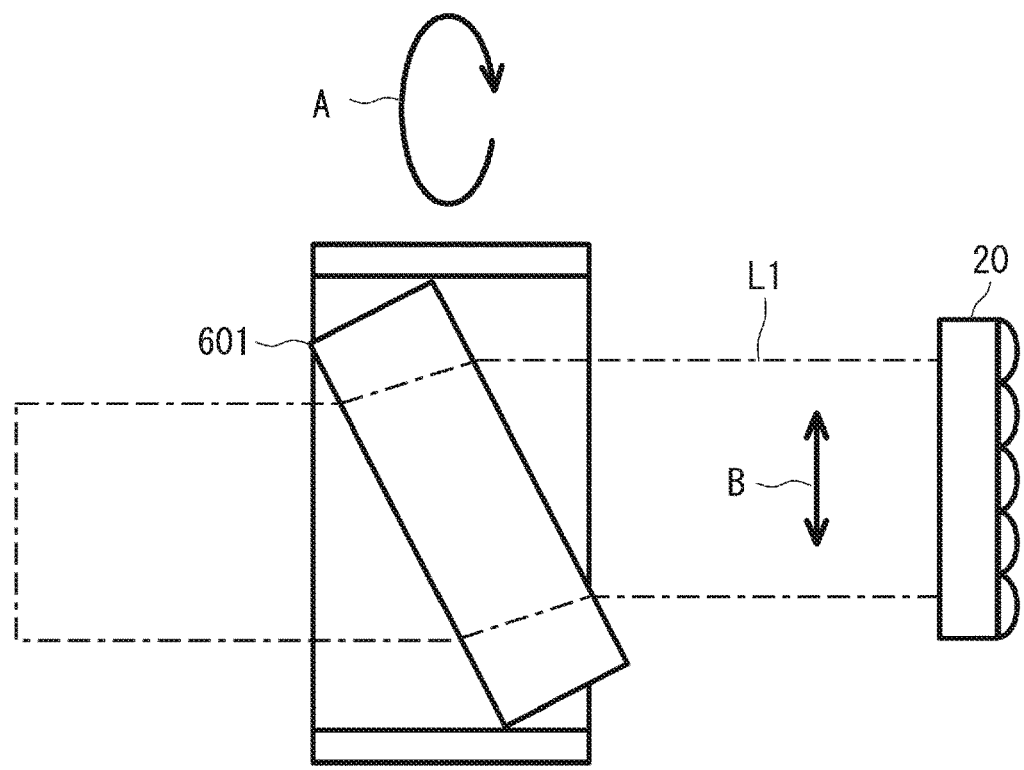
FIG. 20 is a diagram showing a configuration of a main part in a modified example 4.

In a modified example 4, a configuration for uniformize the spatial distribution of the laser light L1 that enters a sample 37 is added to the spectroscopic microscope 100 FIG. 2. Specifically, a transparent parallel flat plate 601 inclined with respect to the optical axis is arranged in front of a cylindrical lens 20 as shown in FIG. 20. When the parallel flat plate 601 rotates as indicated by the arrow A using the axis parallel to the optical axis as the rotation axis, the laser light L1 is scanned in the direction of the arrow B (the rotation direction in the XY plane (the plane perpendicular to the sheet)). Thus, while the angle of the laser light L1 is maintained, the incident position on the cylindrical lens array 20 is changed similarly to the above. Accordingly, it is possible to substantially uniformize the multi-line illumination that enters the sample 37.

Modified Example 5

Figure 21:
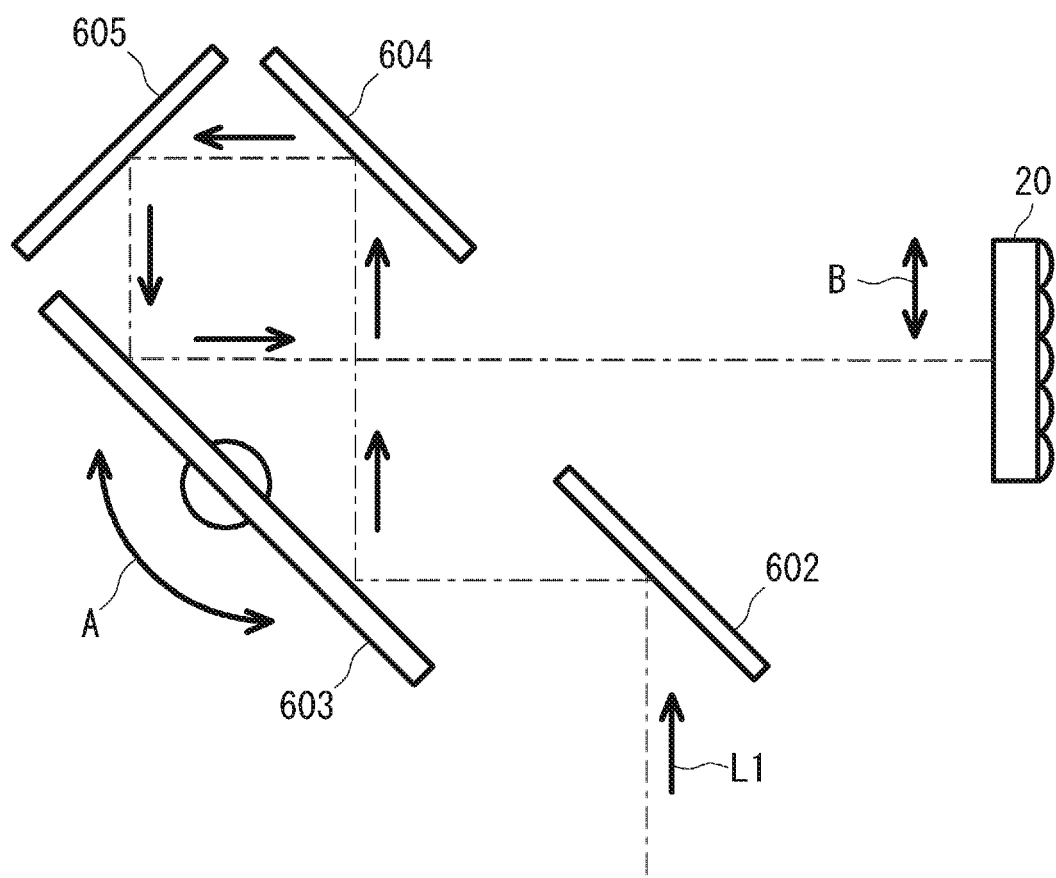
FIG. 21 is a diagram showing a configuration of a main part in a modified example 5.

In a modified example 5, a configuration for uniformize the spatial distribution of the laser light L1 that enters a sample 37 is added to the spectroscopic microscope 100 FIG. 2. Specifically, a mirror 602, a scanning mirror 603, a mirror 604, and a mirror 605 are arranged in front of a cylindrical lens 20 as shown in FIG. 21. The scanning mirror 603 is attached to an actuator so as to change the angle in the direction of the arrow A. That is, the inclination of the reflection surface of the scanning mirror 603 is changed as indicated by the arrow A.

The laser light L1 reflected by the mirror 602 enters the scanning mirror 603. The laser light L1 reflected by the scanning mirror 603 is reflected by the mirrors 604 and 605 and enters the scanning mirror 603 again. The laser light L1 reflected by the scanning mirror 603 again enters the cylindrical lens array 20. By moving the scanning mirror 603 in the direction of the arrow A, the laser light L1 that enters the cylindrical lens 20 is scanned in the direction of the arrow B. Thus, while the angle of the laser light L1 is maintained, the incident position on the cylindrical lens array 20 is changed similarly to the above. Accordingly, it is possible to substantially uniformize the multi-line illumination that enters the sample 37.

Eighth Embodiment

Figure 22:
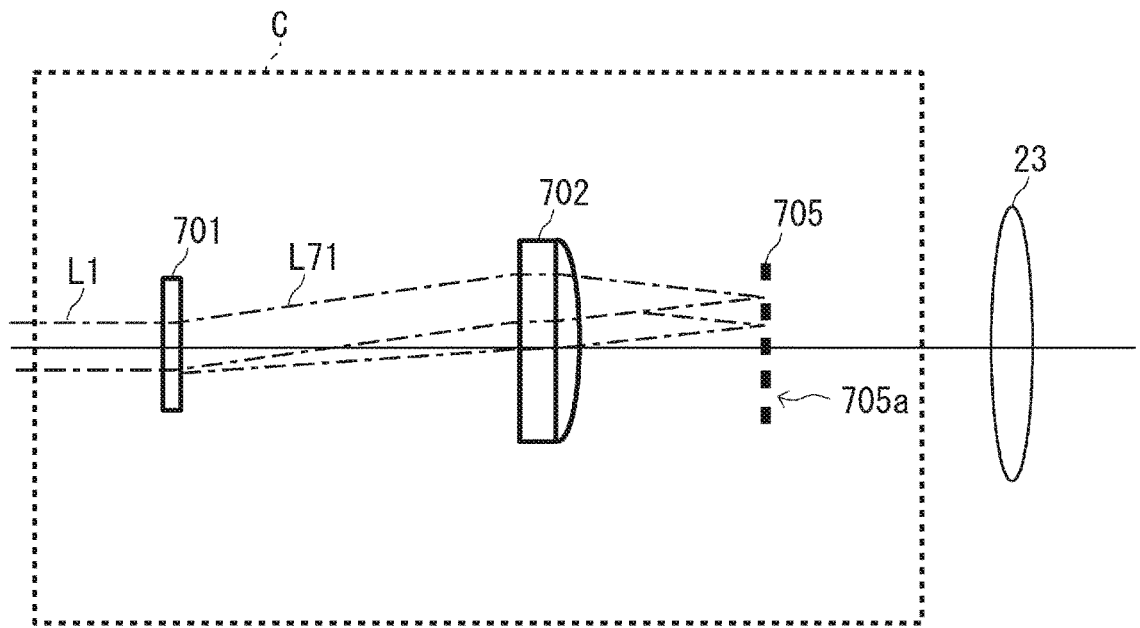
FIG. 22 is a diagram showing a configuration of a main part of a spectroscopic microscope according to an eighth embodiment.

A spectroscopic microscope according to an eighth embodiment is different from that in FIG. 2 in a configuration for forming a plurality of linear illumination regions. FIG. 22 shows a configuration of a main part of the spectroscopic microscope according to the eighth embodiment. The portion C encircled by the rectangle in FIG. 22 is replaced from the cylindrical lens array 20 in FIG. 2. That is, the portion encircled by the dotted-line rectangle is arranged instead of the cylindrical lens array 20 in FIG. 2. Note that, the configuration except for the portion encircled by the dotted-line rectangle in FIG. 22 is similar to the above embodiments, and the description thereof is omitted.

In front of the lens 23, a hologram element 701, a cylindrical lens 702, and a mask 705 are arranged. The hologram element 701 divides the laser light L1 into a plurality of diffracted light rays L71. The diffracted light rays L71 have angles according to the diffraction order. Thus, the diffracted light rays L71 are emitted from the hologram element 701 at different angles from each other. Then, the diffracted light rays L71 enter the cylindrical lens 702. The cylindrical lens 702 condenses the diffracted light rays L71 on the mask 705. Note that, the cylindrical lens 702 condenses the diffracted light rays L71 in the X direction. The cylindrical lens 702 forms multi-line illumination on the sample 37.

Note that, the mask 705 is provided behind the cylindrical lens 702. The mask 705 includes a plurality of slits 705a similarly to the multi-slit part 51. Then, slits 705a have its longitudinal direction in the Y direction. The mask 705 blocks the 0-th order light and unnecessary diffracted light rays. The diffracted light rays L71 having passed through the mask 705 enter the lens 23. Note that, the mask 705 may not be provided.

Modified Example 6

Figure 23:
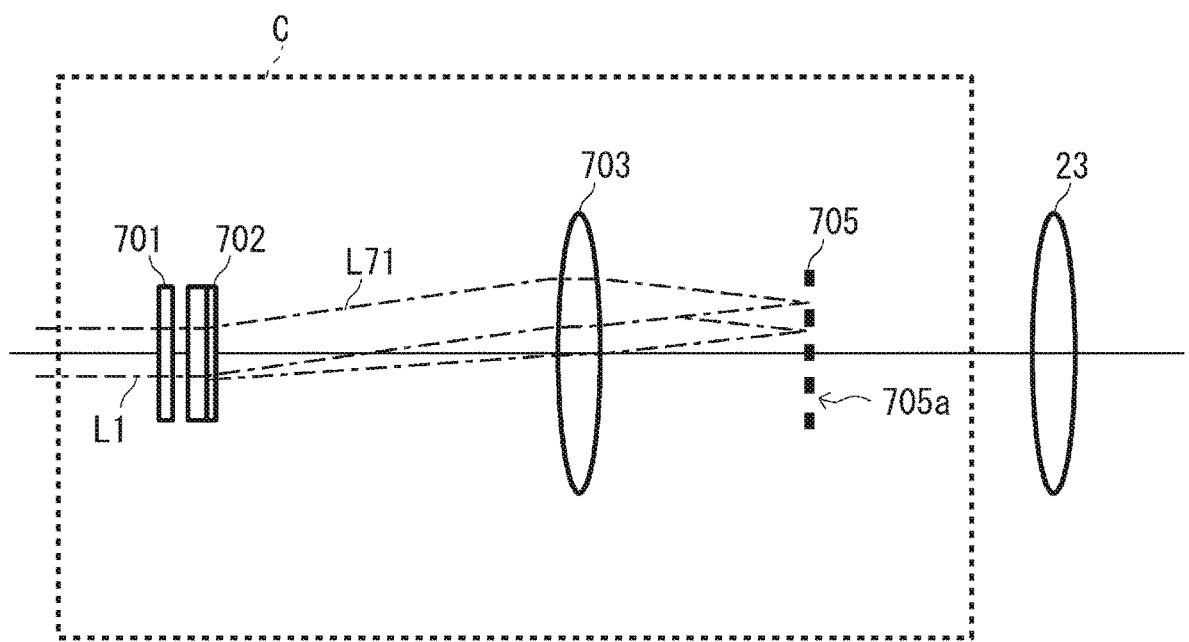
FIG. 23 is a diagram showing a configuration of a main part in a modified example 6.

A modified example 6 is described with reference to FIG. 23. FIG. 22 shows a configuration of a main part of a spectroscopic microscope according to the modified example 6. In the modified example 6, the portion C encircled by the rectangle in FIG. 23 is replaced from the cylindrical lens array 20 in FIG. 2 similarly to the eighth embodiment. In front of the lens 23, a hologram element 701, a cylindrical lens 702, a lens 703, and a mask 705 are arranged. The lens 703 is added to the configuration in FIG. 22. In addition, the orientation of the cylindrical lens 702 is different from that in FIG. 22. Note that, the description of the configuration common to that in FIG. 22 is appropriately omitted.

The hologram element 701 divides the laser light L1 into a plurality of diffracted light rays L71. The diffracted light rays L71 are emitted from the hologram element 701 at different angles from each other. Then, the diffracted light rays L71 enter the cylindrical lens 702. The cylindrical lens 702 condenses light in the direction perpendicular to the sheet (the Y direction). The diffracted light rays L71 from the cylindrical lens 702 are condensed by a lens 703. In this manner, it is possible to form the multi-line illumination by combination of the cylindrical lens 702 and the lens 703.

Note that, the mask 705 is provided behind the lens 703. The mask 705 includes a plurality of slits 705a similarly to the multi-slit part 51. Then, the slits 705a have its longitudinal direction in the Y direction. The mask 705 blocks the 0-th order light and unnecessary diffracted light rays. The diffracted light rays L71 having passed through the mask 705 enter the lens 23. Note that, the mask 705 may not be provided.

The configurations of the first to eighth embodiments can be appropriately combined. In the first to eighth embodiments, by scanning multi-line laser light, it is possible to generate a two-dimensional image of a sample. Note that, signal light has been mainly described as Raman scattering light in the above embodiments, but signal light may be light other than Raman scattering light. Thus, the spectroscopic microscope according to the present embodiment may be a spectroscopic microscope other than the Raman spectroscopic microscope. For example, the spectroscopic microscope according to the present embodiment may be a spectroscopic microscope that detects fluorescence excited by excitation light or a spectroscopic microscope that measures an infrared absorption spectrum or a near infrared absorption spectrum. In the case of these spectroscopic microscopes, it is possible to measure a spectrum in a short time. In particular, the spectroscopic microscope according to the present embodiment is suitable for a spectroscopic microscope that requires high-speed measurement or repeated measurement. The use of the spectroscopic microscope is not limited to imaging. When a sample is a uniform sample, such as solution, a wide area can be measured simultaneously, and the signal amount is increased, and it is possible to shorten the measurement time. In this case, the measured spectrums are integrated.

In the above, the invention made by the present inventor has been specifically described with referent to the embodiments, but the present invention is not limited to the above embodiments, and it is obvious that various modifications can be made without departing from the scope of the invention.

This application is based upon and claims the benefit of priority from Japanese Patent Application No. 2017-20786, filed on Feb. 7, 2017, the disclosure of which is incorporated herein in its entirety by reference.

REFERENCE SIGNS LIST

1 Sample
2 Detection optical system
3 Multi-slit part
4 Wavelength dispersing element
5 Photodetector
10 Illumination optical system
11 Light source
12 Glan-laser prism
13 Half wave plate
14 Mirror
15 Laser line filter
16 Lens
17 Lens
18 Mirror
19 Mirror
20 Cylindrical lens array
21 Mirror
22 Mirror
23 Lens
31 Edge filter
32 Galvanometer mirror
33 Lens
34 Lens
35 Mirror
36 Objective lens
37 Sample
40 Detection optical system
41 Wavelength selection part
42 Low-pass filter
43 Bandpass filter
44 Lens
46 Cylindrical lens array
51 Multi-slit part
52 Slit plate
53 Slit
60 Spectrometer
61 Spectral part
62 Photodetector
63 Pixel
100 Spectroscopic microscope
110 Illumination optical system
112 Spatial phase modulator
113 Lens
114 DMD
115 Lens
116 Lens
117 Spatial modulator
121 First dichroic mirror
122 Second dichroic mirror
136 Objective lens
137 Sample
138 Stage
141 Lens
142 Second multi-slit part
143 Second spectrometer
145 Lens
146 Second multi-slit part
147 Second spectrometer
200 Spectroscopic microscope
301 Objective lens
302 Cover glass
303 Sample
304 Cover glass
305 Objective lens
307 Dichroic mirror
411 White light source
431 Beam splitter
501 Transmission illumination optical system
601 Parallel flat plate
701 Hologram element
702 Cylindrical lens
705 Mask

The invention claimed is:

1. A spectroscopic microscope comprising:
a light source configured to generate light;
a multi-slit part including a plurality of slits through which signal light from an illumination region of a sample illuminated with the light passes, the slits being arranged in a slit width direction; and
a spectrometer configured to disperse the signal light that has passed through the slits in a dispersion direction intersecting a slit length direction and to detect the signal light with a two-dimensional array photodetector,
wherein a plurality of linear illumination regions on the sample is illuminated with the light,
wherein the plurality of linear illumination regions is scanned in a direction perpendicular to a longitudinal direction of the linear illumination region,
wherein the sample and the multi-slit part are arranged at a conjugate position, and
wherein the signal light from each of the linear illumination regions passes through each slit of the multi-slit part.

2. The spectroscopic microscope according to claim 1, further comprising a wavelength selection part provided in an optical path from the sample to the spectrometer and configured to select a wavelength range of the signal light, wherein the wavelength selection part includes at least one of an optical filter, a liquid crystal filter and a spectrometer.

3. The spectroscopic microscope according to claim 2, wherein a wavelength range to be selected by the wavelength selection part is variable.

4. The spectroscopic microscope according to claim 1, wherein at least one of a slit width, a position, and the number of the slits is variable.

5. The spectroscopic microscope according to claim 4, wherein
the multi-slit part is formed by a slit plate comprising at least a first slit group including a plurality of slits having a first slit width and a second slit group including a plurality of slits having a second slit width, and
a condition in which the signal light passes through the slits of the first slit group and enters the spectrometer and a condition in which the signal light passes through the slits of the second slit group and enters the spectrometer are switched by moving the slit plate.

6. The spectroscopic microscope according to claim 4, wherein the multi-slit part includes a liquid crystal panel.

7. The spectroscopic microscope according to claim 6, wherein an illumination optical system from the light source to the sample comprises a spatial modulator configured to modulate light according to a control signal to illuminate the linear illumination regions on the sample.

8. The spectroscopic microscope according to claim 1, wherein
the spectrometer comprises at least:
a first spectrometer configured to detect the signal light in a first wavelength band; and
a second spectrometer configured to detect the signal light in a second wavelength band different from the first wavelength band, and
the multi-slit part is arranged on an incident side of each of the first spectrometer and the second spectrometer.

9. The spectroscopic microscope according to claim 1, wherein
the two-dimensional array photodetector comprises at least:
a first region configured to detect the signal light in a first wavelength band; and
a second region configured to detect the signal light in a second wavelength band different form the first wavelength band, and
the first region is shifted from the second region in a longitudinal direction of the slits, wherein pixels of the first region are different from pixels of the second region in the two-dimensional array photodetector.

10. The spectroscopic microscope according to claim 1, wherein
an illumination optical system from the light source to the sample comprises an objective lens configured to condense the light from the light source on the sample,
a reflection member configured to reflect the signal light generated at the sample is arranged on a side of the sample opposite to the objective lens, and
the signal light reflected by the reflection member enters the objective lens, wherein the reflection member includes at least one of a mirror, a dichroic mirror and an optical filter.

11. The spectroscopic microscope according to claim 1, further comprising a cylindrical lens array arranged on an incident side of the multi-slit part and configured to condense the signal light on the slits.

12. A spectroscopic observation method comprising the steps of:
generating light;
guiding the light to a sample;
causing signal light from an illumination region of the sample illuminated with the light to enter a multi-slit part having a plurality of slits arranged in a slit width direction; and
dispersing the signal light having passed through the slits of the multi-slit part in a dispersion direction intersecting a slit length direction and detecting the signal light with a two-dimensional array photodetector,
wherein a plurality of linear illumination regions on the sample is illuminated with the light,
wherein the plurality of linear illumination regions is scanned in a direction perpendicular to a longitudinal direction of the linear illumination region,
wherein the sample and the multi-slit part are arranged at a conjugate position, and
wherein the signal light from each of the linear illumination regions passes through each slit of the multi-slit part.

* * * * *